(12) United States Patent
Koch et al.

(10) Patent No.: US 11,517,822 B1
(45) Date of Patent: *Dec. 6, 2022

(54) SYSTEMS AND METHODS FOR CHALLENGES BETWEEN UNIQUE DIGITAL ARTICLES BASED ON REAL-WORLD INFORMATION

(71) Applicant: Mythical, Inc., Sherman Oaks, CA (US)

(72) Inventors: Rudy Koch, Sammamish, WA (US); John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/709,170

(22) Filed: Mar. 30, 2022

Related U.S. Application Data

(63) Continuation of application No. 17/533,910, filed on Nov. 23, 2021, now Pat. No. 11,369,878.

(60) Provisional application No. 63/216,881, filed on Jun. 30, 2021.

(51) Int. Cl.
| | |
|---|---|
| *A63F 13/65* | (2014.01) |
| *A63F 13/35* | (2014.01) |
| *A63F 13/795* | (2014.01) |
| *A63F 13/63* | (2014.01) |
| *A63F 13/533* | (2014.01) |

(52) U.S. Cl.
CPC ............. *A63F 13/65* (2014.09); *A63F 13/35* (2014.09); *A63F 13/533* (2014.09); *A63F 13/63* (2014.09); *A63F 13/795* (2014.09); *A63F 2300/308* (2013.01); *A63F 2300/5513* (2013.01); *A63F 2300/5566* (2013.01); *A63F 2300/575* (2013.01); *A63F 2300/6018* (2013.01); *A63F 2300/69* (2013.01)

(58) Field of Classification Search
CPC ....................................................... A63F 13/65
See application file for complete search history.

(56) References Cited

U.S. PATENT DOCUMENTS

| | | |
|---|---|---|
| 11,062,284 B1 | 7/2021 | Cunningham |
| 11,331,579 B1 | 5/2022 | Koch |
| 11,338,204 B1 | 5/2022 | Koch |
| 2014/0024435 A1 | 1/2014 | Scott |
| 2015/0287278 A1 | 10/2015 | Shore |
| 2019/0028264 A1 | 1/2019 | Bisti |
| 2019/0028265 A1 | 1/2019 | Bisti |
| 2019/0130698 A1 | 5/2019 | Simons |

(Continued)

*Primary Examiner* — Jay Trent Liddle
(74) *Attorney, Agent, or Firm* — Esplin & Associates, PC

(57) ABSTRACT

Systems and methods to effectuate challenges between unique digital articles, the challenges being evaluated based on particular real-world information, are disclosed. Exemplary implementations may execute instances of a game; manage player accounts associated with the players, including a first and a second player account associated with a first and a second player; present a first user interface to a first player that enables the first player to define an objective for a challenge between a first and a second unique digital article, define one or more stakes for this challenge, and invite the second player to partake in this challenge, record executable code on a permanent registry to evaluate the challenge, based on real-world information; and responsive to the first or second unique digital article winning the challenge, distribute the one or more stakes to the first or second player, respectively.

20 Claims, 8 Drawing Sheets

(56) References Cited

U.S. PATENT DOCUMENTS

| | | |
|---|---|---|
| 2019/0260576 A1 | 8/2019 | Bisti |
| 2019/0299105 A1 | 10/2019 | Knight |
| 2020/0153610 A1 | 5/2020 | Bisti |
| 2021/0106920 A1 | 4/2021 | Lim |
| 2021/0118085 A1 | 4/2021 | Bushnell |
| 2021/0201336 A1 | 7/2021 | Mallett |
| 2021/0327216 A1 | 10/2021 | Naramore |
| 2021/0331077 A1 | 10/2021 | Gordon, Jr. |
| 2022/0016529 A1 | 1/2022 | Meilich |

SYSTEMS AND METHODS FOR CHALLENGES BETWEEN UNIQUE DIGITAL ARTICLES BASED ON REAL-WORLD INFORMATION

FIELD OF THE DISCLOSURE

The present disclosure relates to systems and methods to effectuate challenges between unique digital articles, the challenges being evaluated based on particular real-world information.

BACKGROUND

Online gaming platforms are known. Distributed registries are known techniques to produce a secure record or registry of rights pertaining to assets or articles, transactions, and other information. Many types of digital articles are known. Blockchain oracles are known.

SUMMARY

One aspect of the present disclosure relates to a system configured to effectuate challenges between unique digital articles, the challenges being evaluated based on particular real-world information. The unique digital articles are associated with in-game player-controllable characters configured to be used in instances of games within an online gaming platform. The system may include the online gaming platform, a registry server, a real-world information server, and/or other components. The online gaming platform may include one or more hardware processors configured by machine-readable instructions. The system may be configured to execute, within the online gaming platform, an instance of a game to facilitate presentation of the game to players, and implement in-game actions in the instance of the game in response to in-game action instructions for the in-game actions by the players. Presentation of the game is based on views of the game that are determined during execution of the instance of the game. The players may include a first player and a second player. The system may be configured to manage player accounts associated with the players. The player accounts may include a first player account associated with the first player and a second player account associated with the second player. The first player account may include a first account inventory of a first set of virtual items. The second player account may include a second account inventory of a second set of virtual items. The first player controls the first set of virtual items in the first account inventory. The second player controls the second set of virtual items in the second account inventory. The first account inventory may include a first unique digital article that is associated with a first in-game player-controllable character usable in the instance of the game. The second account inventory may include a second unique digital article that is associated with a second in-game player-controllable character usable in the instance of the game. The system may be configured to effectuate a first presentation of a first user interface to the first player that enables the first player, through first player input. The first player input defines an objective for a challenge between the first unique digital article and the second unique digital article. The challenge will be evaluated based on real-world information. The first player input defines one or more stakes for the challenge. The one or more stakes may include one or more virtual items and/or objects that are usable within the online gaming platform. The first player input initiates transmission of information representing an invitation for the second player to partake in the challenge through the second unique digital article. The information is transmitted to a client computing platform associated with the second player. The invitation corresponds to the objective and the one or more stakes as defined through the first user interface. The system may be configured to effectuate a second presentation of the invitation to the second player. The system may be configured to receive, from the client computing platform associated with the second player, an indication of acceptance, by the second player, of the invitation to partake in the challenge. The system may be configured to generate and transfer, to a registry server that implements a permanent registry, a set of instructions to record and/or modify. The set of instructions may record a first set of usage information pertaining to the first unique digital article. The set of instructions may record a second set of usage information pertaining to the second unique digital article. The set of instructions may record executable code pertaining to the challenge. The registry server may include one or more processors configured by one or more machine-readable instructions. The system may be configured to receive and execute (i) a first set of instructions to record, on the permanent registry, the first set of usage information, wherein the first set of usage information controls usage by the first player of the first unique digital article, and (ii) a second set of instructions to record, on the permanent registry, the second set of usage information, wherein the second set of usage information controls usage by the second player of the second unique digital article. The first set of usage information controls a first sensitivity of the first unique digital article to partake in the challenges. The second set of usage information controls a second sensitivity of the second unique digital article to partake in the challenges. The system may be configured to record, on the permanent registry, the executable code. The executable code is configured to receive the real-world information from a real-world information server. The executable code is configured to perform one or more evaluations based on the received real-world information. The one or more evaluations evaluate the challenge. The real-world information server may include one or more particular processors configured by particular machine-readable instructions. The system may be configured to determine the real-world information based on events that have occurred in the real world, external to the real-world information server and the system. The system may be configured to transfer the real-world information to at least one of the registry server and the permanent registry. The system may be configured to effectuate execution of the executable code and performance of the one or more evaluations. The system may be configured to, responsive to the performance of the one or more evaluations evaluating that the first unique digital article won the challenge, distribute and/or return the one or more stakes to either the first unique digital article or the first player. The system may be configured to, responsive to the performance of the one or more evaluations evaluating that the second unique digital article won the challenge, distribute and/or return the one or more stakes to either the second unique digital article or the second player.

Another aspect of the present disclosure related to a method of effectuating challenges between unique digital articles, the challenges being evaluated based on particular real-world information. The unique digital articles are associated with in-game player-controllable characters usable in instances of games within an online gaming platform. The method may include executing, within the online gaming platform, an instance of a game to facilitate presentation of the game to players, and implementing in-game actions in the instance of the game in response to in-game action instructions for the in-game actions by the players. Presentation of the game is based on views of the game that are determined during execution of the instance of the game. The players may include a first player and a second player. The method may include managing player accounts associated with the players. The player accounts may include a first player account associated with the first player and a second player account associated with the second player. The first player account may include a first account inventory of a first set of virtual items. The second player account may include a second account inventory of a second set of virtual items. The first player controls the first set of virtual items in the first account inventory. The second player controls the second set of virtual items in the second account inventory. The first account inventory may include a first unique digital article that is associated with a first in-game player-controllable character usable in the instance of the game. The second account inventory may include a second unique digital article that is associated with a second in-game player-controllable character usable in the instance of the game. The method may include generating and transferring sets of instructions to record and/or modify a first set of usage information pertaining to the first unique digital article and a second set of usage information pertaining to the second unique digital article. The method may include effectuating a first presentation of a first user interface to the first player that enables the first player through first player input. The first player input defines an objective for a challenge between the first unique digital article and the second unique digital article. The challenge will be evaluated based on real-world information. The first player input defines one or more stakes for the challenge. The one or more stakes may include one or more virtual items and/or objects that are usable within the online gaming platform. The first player input initiates transmission of information representing an invitation for the second player to partake in the challenge through the second unique digital article. The information is transmitted to a client computing platform associated with the second player. The invitation corresponds to the objective and the one or more stakes as defined through the first user interface. The method may include effectuating a second presentation of the invitation to the second player. The method may include receiving, from the client computing platform associated with the second player, an indication of acceptance, by the second player, of the invitation to partake in the challenge. The method may include generating and transferring a set of instructions to record and/or modify (i) a first set of usage information pertaining to the first unique digital article, (ii) a second set of usage information pertaining to the second unique digital article, and (iii) executable code pertaining to the challenge. The method may include receiving and executing (i) a first set of instructions to record, on the permanent registry, the first set of usage information, wherein the first set of usage information controls usage by the first player of the first unique digital article, and (ii) a second set of instructions to record, on the permanent registry, the second set of usage information, wherein the second set of usage information controls usage by the second player of the second unique digital article. The first set of usage information controls a first sensitivity of the first unique digital article to partake in the challenges. The second set of usage information controls a second sensitivity of the second unique digital article to partake in the challenges. The method may include recording, on the permanent registry, the executable code. The executable code is configured to receive the real-world information from a real-world information server. The executable code is configured to perform one or more evaluations based on the received real-world information. The one or more evaluations evaluate the challenge. The method may include determining the real-world information based on events that have occurred in the real world, external to the real-world information server and the system. The method may include transferring the real-world information to at least one of the registry server and the permanent registry. The method may include effectuating execution of the executable code and performance of the one or more evaluations. The method may include, responsive to the performance of the one or more evaluations evaluating that the first unique digital article won the challenge, distributing and/or returning the one or more stakes to either the first unique digital article or the first player. The method may include, responsive to the performance of the one or more evaluations evaluating that the second unique digital article won the challenge, distributing and/or returning the one or more stakes to either the second unique digital article or the second player.

As used herein, any association (or relation, or reflection, or indication, or correspondency, or correlation) involving servers, processors, client computing platforms, players, player accounts, inventories, articles, digital articles, requests, manners of usage, exchanges, challenges, objectives, stakes, offers, transactions, in-game actions, accessibility, sensitivities, eligibilities, benefits, ownership, permanent registries, responses, denials, contracts, metrics, metric values, scores, gains, trigger events, incentives, proposals, sets of instructions, operations, determinations, distributions, transfers, presentations, interfaces, notifications, and/or another entity or object that interacts with any part of the system and/or plays a part in the operation of the system, may be a one-to-one association, a one-to-many association, a many-to-one association, and/or a many-to-many association or "N"-to-"M" association (note that "N" and "M" may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
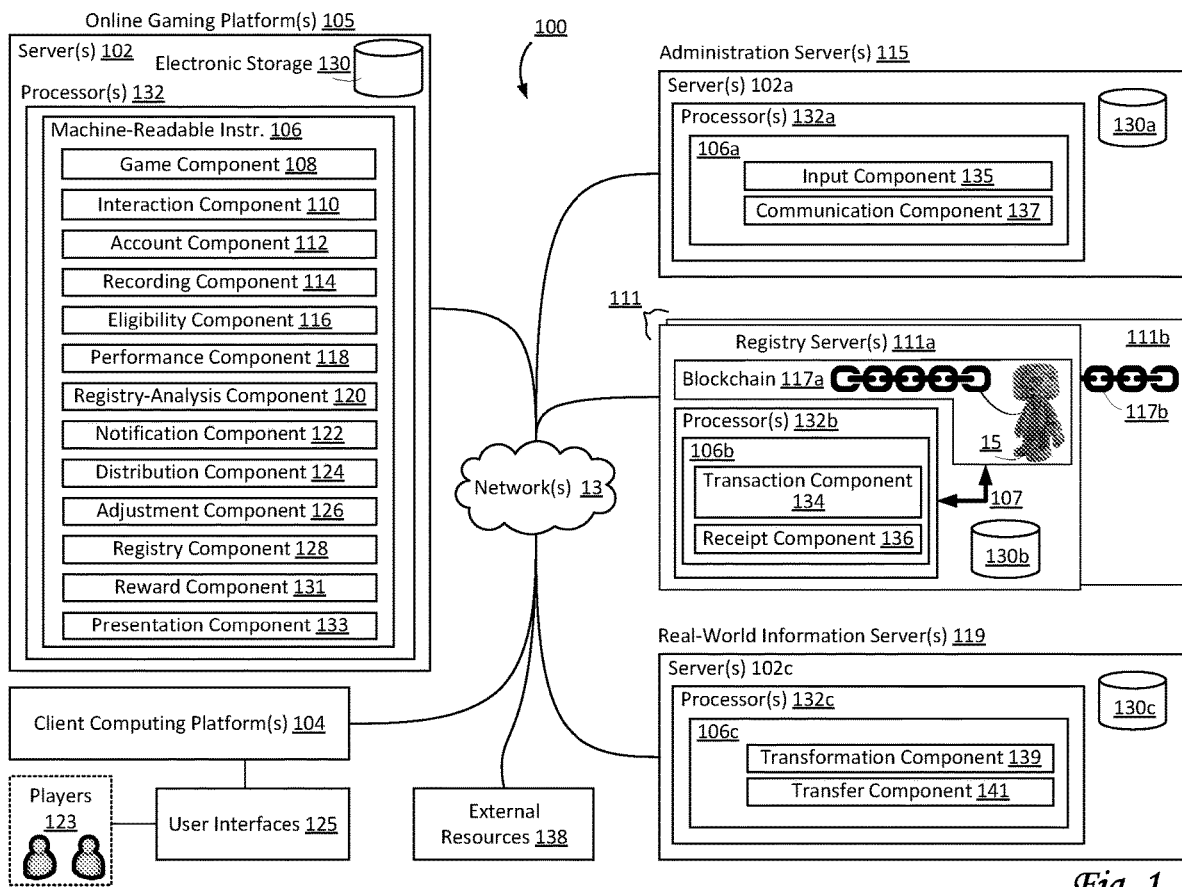
FIG. 1 illustrates a system configured to effectuate challenges between unique digital articles, the challenges being evaluated based on particular real-world information, in accordance with one or more implementations.

FIG. 1 illustrates a system 100 configured to provide challenges between unique digital articles, the challenges being evaluated based on real-world information, in accordance with one or more implementations. As used herein, challenges refer to an individual player challenging one or more other players, through their respective unique digital articles. For example, a challenge may be a player-to-player challenge, a player-to-unique digital article challenge, or a unique-digital-article-to-unique-digital-article challenge. For example, a challenge may be a player-initiated challenge (and may be not initiated or controlled by the game-logic of an instance of a game). In some implementations, challenges are not initiated or controlled by online gaming platform 105 itself. Instead, an individual player may challenge another player to a contest, a competition, and/or another type of challenge for which success, failure, winning and/or defeat can be determined based on real-world information. For example, the individual player may determine and/or select which unique digital article or other player is invited (i.e., offered a chance) to participate in a particular challenge. In some implementations, a challenge must include participants that have mutually exclusive goals, such that at least one participant wins and at least one participant loses (unless the challenge itself somehow is not completed, concluded, and/or otherwise invalidated). Barring foul play, cheating, disqualifications, and other exceptions, a challenge produces a winner and a loser, and the winner wins something from the loser. In some implementations, challenges may only be initiated through and between unique digital articles that are sensitive and/or eligible to partake in (real-world-information-based) challenges. For example, this sensitivity and/or eligibility may be configurable per unique digital article (in other words, specific to individual unique digital articles), and, depending on the implementation, either players and/or online gaming platform 105 may configure and/or control this sensitivity and/or eligibility. Unless otherwise stated, challenges refer to challenges within system 100, which may be referred to as system-internal challenges, or internal challenges. Partaking in a challenge may refer to any participant, whether initiating a challenge or accepting an invitation to a challenge.

As used herein, the terms "real world" and "real-world information" refer to the physical world external to system 100 (and external to online gaming platform(s) 105, administration server(s) 115, registry server(s) 111, and real-world information server(s) 119), as well as information obtained therefrom and/or otherwise based thereon. By way of non-limiting example, real-world information may refer to quantifiable and/or deterministic data about events and/or activity that have/has occurred in the real world. By way of non-limiting example, results from competitions including sports are real-world information. Weather data, traffic information, stock prices, election results, results of real-world measurements, box office returns, financial market data, and thousands of other types of data may be real-world information. In some implementations, challenges may have consequences for the participants. For example, participants of challenges may define one or more stakes for the challenges, and the consequences may include winning or losing one or more stakes. The consequences may include in-game consequences (for players) and/or external consequences that are external to online gaming platform 105. By way of non-limiting example, consequences may include positive consequences, negative consequences, and/or neutral consequences. By way of non-limiting example, a positive consequence may include distributions (and/or other provisions) of stakes and/or benefits, e.g., to a player or to a unique digital article. By way of non-limiting example, a negative consequence may include losing something (e.g., one or more stakes) of value or use, e.g., something of value or use within online gaming platform 105. Positive consequences may be referred to as benefits. Negative consequences may be referred to as loss or risk. For example, the loser of a challenge may, as a consequence, lose one or more stakes to the winner.

As used herein, the term "benefit" may represent anything of value or use in system 100, or online gaming platform 105, or registry servers 111, or anything that can be exchanged or otherwise traded for something of such value or use, whether tangible or not, whether physical and/or virtual. As a preliminary and non-limiting example, by virtue of the systems and methods described in this disclosure, an individual player who owns a particular unique digital article (that is linked or otherwise has a sensitivity to specific real-world information such as, say, results of one or more Oakland Athletics baseball games, and/or has a sensitivity or eligibility to partake in challenges involving consequences based on the specific real-world information) may either receive a particular benefit (e.g., an in-game stake such as an in-game currency within online gaming platform 105) or lose a particular stake (e.g., a particular amount of an in-game currency within online gaming platform 105), responsive to the Oakland A"s winning or losing, respectively. The real-world event of this baseball game may be used as a basis for evaluating a particular challenge (and/or corresponding particular consequences), provided that each of the participating players has opted for their respective unique digital articles to be exposed to these challenges, and agreed to partake in this particular challenge. The corresponding particular consequences may include at least one positive consequence (e.g., the winner winning the loser's stake) and at least one negative consequence (e.g., the loser losing a stake to the winner). In this example, each of the participating players, through their unique digital articles, has put up a particular amount of the in-game currency as their stake. In other words, the risk to each of the individual players (in the context of this particular evaluation of this particular challenge) is the particular staked amount of the in-game currency. In implementations where owners can opt-in and/or opt-out of being exposed to these types of challenges, the sensitivity or eligibility may be referred to as player-configurable or player-controlled.

As used herein, the term "unique digital article" may refer to digital articles that are uniquely identified and/or uniquely identifiable, e.g., by an identifier or by identifying information. For example, in some implementations, an identifier or identifying information may include or be based on a combination of different types of information, including but not limited to information regarding the type of a digital article, a serial number and/or other numerical identifier of the digital article, and/or other types of information. As used herein, rights pertaining to unique digital articles may be tracked, recorded, and/or otherwise registered on one or more permanent registries. As such, a unique digital article may be a registry-tracked unique digital article. In some cases, this accessibility may include ownership.

Individual unique digital articles may be associated and/or correlated with another entity (which may be referred to as a "correlated entity") by virtue of technology provided and/or supported by the one or more permanent registries on which the rights pertaining to the individual unique digital articles is tracked (including but not limited to smart contracts and/or other executable code on the one or more permanent registries). Accordingly, rights pertaining to a unique digital article may correlate to the provision of one or more rights (e.g., accessibility) with respect to the correlated entity (e.g., control and/or other accessibility). Transactions involving a unique digital article recorded on a permanent registry may correlate to certain transactions (or modifications) of the correlated entity, and/or vice versa.

In some implementations, correlated entities may be (or include) virtual items configured to be used within online-gaming platform 105 (such as, for example, a player-controllable in-game virtual character that is usable within an instance of a game within online gaming platform 105). Other types and/or combinations of correlated entities are envisioned within the scope of this disclosure, including but not limited to physical and/or virtual objects, items, rights, memberships, grants, etc. The use of the singular "entity" or "correlated entity" is not intended to be limiting, as multiple different objects, items, rights, memberships, grants, etc. may be correlated to a single unique digital article. By way of non-limiting example, a correlated entity may be an art work, a ticket to an event, a subscription to certain media content, a bundle of rights related to captured audio and/or video information, ownership of or accessibility to distribution gains, and so forth. As used herein, the term "non-fungible token" or "NFT" may be used to refer to a combination of a particular unique digital article and a particular correlated entity that is correlated to the particular unique digital article.

System 100 may include one or more online gaming platforms 105, registry server(s) 111, administration server(s) 115, real-world information server(s) 119, client computing platform(s) 104, user interface(s) 125, server(s) 102, external resource(s) 138, and/or other components. Players 123 (also referred to as users) may include one or more of a first player, a second player, a third player, a fourth player, an administrative user, and/or other players. Players 123 may include players who play and/or otherwise interact on online gaming platform 105. As used in descriptions herein, any use of the term "player" may refer to player(s) 123. Electronic storage 130a, electronic storage 130b, and electronic storage 130c may be similar to electronic storage 130 as described elsewhere in this disclosure, though included in administration servers 115, registry servers 111, and real-world information servers 119, respectively, as depicted in FIG. 1.

Instances of games may be executed within one or more online gaming platforms 105. As used herein, online gaming platform(s) 105 may refer to either an individual game (e.g., an interactive online game), a type of gaming console and its ecosystem, and/or both. Online gaming platform 105 may be configured to host (and/or execute instances of) the one or more (online) games. Online gaming platform 105 may be operated, hosted, and/or owned by one or more stakeholders of online gaming platform 105. For example, a platform operator (and/or another stakeholder) may sell in-game digital items (e.g., characters, weapons, resources, etc.) to players 123 of online gaming platform 105.

Referring to the game and to online gaming platform 105, individual players may own and/or control individual unique digital articles, correlated entities, and/or other virtual items. In some implementations, players may exchange unique digital articles and/or other virtual items with other players. As used herein, exchanges refer to individual players winning, losing, auctioning, selling, purchasing, trading, bartering, wagering, staking, and/or otherwise exchanging virtual items (directly, without a store or store interface under control of online gaming platform 105) to other individual players or with other individual players (including exchanging virtual items through player-to-player challenges). Due to an exchange, ownership rights of a digital article may transition from an original owner to a new owner (even if there may, in some implementations, be one or more intermediary and/or temporary owners during the process of performing the exchange). In some implementations, unique digital articles may be associated and/or correlated with other rights than ownership rights, such as, by way of non-limiting example, distribution rights.

In some implementations, distribution rights of (unique) digital articles may reflect rights held by the individual ones of the players 123 to receive certain distributions of benefits upon exchanges involving the particular digital articles. For example, individual players 123 may own rights related to particular digital articles that guarantee and/or entitle them benefits upon (future) exchanges involving those digital articles regardless of whether the individual players 123 own those digital articles. In some implementations, the distribution gains may result from a particular action or activity (such as, e.g., a sale of a particular digital article), e.g., within the online gaming platform 105, of a particular digital article. As used herein, a distribution gain resulting from a particular action or activity may include one or more of a portion of the proceeds of the particular action or activity, a fee related to the particular action or activity, a minimum payment triggered by the occurrence of the particular action or activity (or a set of particular actions or activities), and/or another arrangement for payment and/or compensation, including but not limited to combinations of fixed fees, minimum fees, percentages of sales, percentages of profits, and/or other arrangements. The term "portion" does not imply or require a percentage or ratio, but rather is intended to signify that beneficiaries (i.e., the players that hold the distribution rights) may receive something of value and/or use. The distribution gains may include one or more virtual currencies such as virtual tokens, virtual stars, virtual points, virtual real-world currencies (e.g., US Dollars), and/or other gains that are based on the particular digital articles.

In some implementations, (unique) digital articles, correlated entities, and/or other virtual items may include and/or be virtual items that are not fungible and may be usable within online gaming platform 105. In some implementations, one or more of these may represent (three-dimensional) in-game player-controllable characters that can interact with other (in-game) virtual items within online gaming platform 105. In some implementations, virtual items may include one or more of weapons, toys, characters, abilities, skills, tools, pets, clothing, vehicles, game levels, missions, assignments, chapters, tasks, mini-games, restricted areas within a virtual space, restricted modes of gameplay, access rights within an online game, and/or other virtual items. In some implementations, virtual items may refer to any item or object within online gaming platform 105 for which a player may use, own, sell, trade, destroy, and/or otherwise effectuate a change of ownership or control.

As used herein, a digital article is fungible if it is functionally and/or physically indistinguishable from another digital article. For example, a payment token such as a Bitcoin is fungible. A digital article may be non-fungible if it is unique, or one-of-a-kind. For example, a specific individual CryptoKitty™ may be non-fungible. A digital article may be semi-fungible if there is a set of a limited number of similar but distinguishable digital articles. For example, a limited-edition Blanko™ or another in-game character may be semi-fungible. For example, one of a limited number of 2-dimensional or 3-dimensional in-game virtual items may be semi-fungible. For example, a digital ticket to a show, concert, exhibition, and/or other event may be semi-fungible. For example, a piece of art or jewelry (e.g., as a virtual item or as representing a physical item) may be semi-fungible. As used herein, semi-fungible digital articles are considered as unique, "not fungible", or non-fungible digital articles. In some implementations, digital articles may be usable within one or more games.

Registry server(s) 111 (e.g., registry server 111a, registry server 111b, and so forth) may be used to implement one or more permanent registries, including but not limited to blockchain 117a, blockchain 117b (partially visible in FIG. 1), and so forth. In some implementations, one or more permanent registries may be decentralized and/or immutable registries. In some implementations, blockchain 117a and blockchain 117b may be maintained by distributed computing platforms (not shown in FIG. 1). In some implementations, a distributed computing platform may be implemented by a set of client computing platforms and/or servers (including, for example, one or more registry servers 111). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of blockchain 117a. For example, the smart contracts may be stored on blockchain 117a, blockchain 117b, and/or another permanent registry. In some implementations, the distributed computing platform may be the EOSIO platform. In some implementations, the distributed computing platform may be similar to or based on the EOSIO platform. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of the permanent registries implemented by registry servers 111 is a private permissioned permanent registry (e.g., a private permissioned blockchain). The private permissioned permanent registry may be configured to record information. The recorded information may include information pertaining to unique digital articles that are associated and/or correlated with in-game player-controllable characters that are configured to be used in an instance of a game. The recorded information may include rights (and/or other usage information) pertaining to the unique digital articles. Implementing the in-game actions in the instance of the game may include, for at least some of the in-game actions implemented in the instance of the game, effectuating modifications to the recorded information pertaining to the unique digital article. For example, ownership rights, usage information, and/or other accessibility information may be modified. In some implementations, a unique digital article may be removed from one permanent registry and added or recorded on another permanent registry. In some implementations, at least one of the permanent registries implemented by registry servers 111 is a public permanent registry (e.g., a public blockchain). The public permanent registry may be configured to be part of either EOSIO mainnet, Ethereum mainnet, Ethereum 1.5, Ethereum 2.0, a derivative of Ethereum 2.0 that is configured to perform transactions of Ether (ETH) between accounts, or a derivative of EOSIO that is configured to perform transactions of EOS between accounts.

Elements of blockchain 117a or another permanent registry may be grouped together in units that are referred to as blocks. For example, an individual block may include one or more digital articles (or digital assets) and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital articles, one or more transactions, smart contracts, and/or other information.

In some implementations, one or more permanent registries implemented by registry servers 111 may be publicly accessible. In some implementations, one or more permanent registries implemented by registry servers 111 may be private and/or permissioned. In some implementations, one or more permanent registries implemented by registry servers 111 may be append-only (such that existing blocks are immutable once they have been added to the registry). In some implementations, existing blocks of one or more permanent registries implemented by registry servers 111 can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

As depicted in FIG. 1, registry server 111a may include one or more of electronic storage 130b, processor(s) 132b, machine-readable instructions 106b, (node of) blockchain 117a, and/or other components. Machine-readable instructions 106b may include one or more instruction components. The instruction components may include computer program components. The instruction components may include one or more of a transaction component 134, a receipt component 136, and/or other instruction components. In some implementations, an individual registry server may be dedicated to a particular node of a permanent registry. Typically, different nodes are included in (or implemented by, or hosted by) different servers or different computer systems to increase the safety and security of transactions on a blockchain. The consensus protocol used for a particular blockchain will be harder to falsify or circumvent when the different nodes are in different geographical locations, on different types of computing platforms, and/or otherwise distributed and diverse. As depicted in FIG. 1, blockchain 117a may include a unique digital article 15 (by way of non-limiting example, unique digital article 15 may be correlated with a player-controllable in-game character, as depicted, and rights pertaining to unique digital article 15 may have been recorded on blockchain 117a, as depicted). Registry server 111b may include similar components as registry server 111a, including but not limited to blockchain 117b and/or other components.

Real-world information server(s) 119 may include one or more of electronic storage 130c, processor(s) 132c, machine-readable instructions 106c, and/or other components. Machine-readable instructions 106c may include one or more instruction components. The instruction components may include computer program components. The instruction components may include one or more of a transformation component 139, a transfer component 141, and/or other instruction components. In some implementations, an individual real-world information server 119 may be dedicated to a particular type of real-world information (e.g., a particular type of sport, or league, or team, or competition, or tournament, etc.). Real-world information servers 119 may be configured to determine information based on events that have occurred in the real world. This information may be referred to as real-world information. This information may be converted, packaged, and/or otherwise formatted so it can be transferred and used by other components of system 100, particularly by smart contracts recorded on permanent registries. In some cases, a real-world information server 119 may be referred to as an oracle or oracle server. A particular real-world information server 119 may operate as an immediate-read oracle, a publish-subscribe oracle, a request-response oracle, and/or as a different type of (blockchain) oracle.

Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Players may access system 100 via client computing platform(s) 104. In some implementations, system 100 and/or registry server(s) 111 may be configured to communicate with one or more of online gaming platform(s) 105, players 123, and/or other entities and/or components, e.g., through one or more networks 13.

Server(s) 102 may include electronic storage 130, processor(s) 132, machine-readable instructions 106, and/or other components. Server(s) 102 may be configured by machine-readable instructions 106. Machine-readable instructions 106 may include one or more instruction components. Instruction components (for any set of machine-readable instructions) may include computer program components. The instruction components may include one or more of a game component 108, an interaction component 110, an account component 112, a recording component 114, an eligibility component 116, a performance component 118, a registry-analysis component 120, a notification component 122, a distribution component 124, an adjustment component 126, a registry component 128, a reward component 131, a presentation component 133, transaction component 134, receipt component 136, an input component 135, a communication component 137, transformation component 139, transfer component 141, and/or other instruction components. Processor(s) 132a, processor(s) 132b, and processor(s) 132c may be similar to processor(s) 132 as described elsewhere in this disclosure, though included in administration servers 115, registry servers 111, and real-world information servers 119, respectively, as depicted in FIG. 1. Machine-readable instructions 106a, machine-readable instructions 106b, and machine-readable instructions 106c may be similar to machine-readable instructions 106 as described elsewhere in this disclosure, though included in administration servers 115, registry servers 111, and real-world information servers 119, respectively, as depicted in FIG. 1.

Game component 108 is configured to execute, via online gaming platform 105, one or more instances of one or more games. An instance of a game may facilitate presentation of the game to players 123. For example, the instance of the game may be an online game executed with online gaming platform 105. Game component 108 may be configured to implement in-game actions in the instance of the game, e.g., in response to (action) requests for the in-game actions by the players. In some implementations, game component 108 may be arranged, organized, and/or otherwise included in online gaming platform 105. As used herein, the term "game" may refer to one or more games within online gaming platform 105. In some implementations, the game may be provided via a virtual space, and may include a plurality of resource types and/or maps.

The presentation of the game may be based on the views of the game that are determined during execution of the game, e.g., as based on instructions and/or other input from players. In some implementations, the view may be communicated (e.g., by streaming, via object/position data, and/or other information) from online gaming platform 105, registry server(s) 111, and/or other sources to client computing platforms 104 for presentation to players 123. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. In some implementations, one or more view parameters may be selectable by player 123.

The instance of the game may include a simulated space that is accessible by players 123 by clients (e.g., client computing platforms 104) that present the views of the virtual space to a player. The simulated space may have a topography, express ongoing real-time interaction by one or more players 123, and/or include one or more objects positioned within the topography that are capable of locomotion and/or movement within the topography. In some implementations, the topography may be a 2-dimensional topography. In some implementations, the topography may be a 3-dimensional topography. The topography may include dimensions of the simulated space, and/or surface features of a surface or objects that are native to the simulated space. In some implementations, the topography may include a surface (e.g., a ground surface) that runs through at least a substantial section of the simulated space. In some implementations, the topography may describe a volume with one or more bodies positioned therein. The instance executed by the computer components may be synchronous, asynchronous, and/or semi-synchronous.

Within the instance of the game, players 123 may control characters, objects, simulated physical phenomena, and/or other elements within the virtual space to interact with the virtual space and/or each other. The characters may include avatars. As used herein, the term "character" or "player character" may refer to an object or group of objects present in the virtual space, that correspond(s) to an individual player. A particular player character may be controlled by the particular player with which it is associated. Such player characters may be referred to as player-controlled characters. Player-controlled element(s) may move through and interact with the virtual space (e.g., non-player characters in the virtual space, other objects in the virtual space, etc.). In some implementations, player-controlled characters may be capable of locomotion within the topography of the simulated space that is included in the instance of the game. For example, different player-controllable characters may interact in the topography of the simulated space. In some implementations, the topography may include one or more restricted areas that are only accessible under certain conditions. In some implementations, player-controlled elements controlled by and/or associated with a given player may be created and/or customized by the given player. Individual players 123 and/or player accounts may own or control an inventory of virtual goods and currency (e.g., resources of a plurality of resource types) that the individual player can use (e.g., by manipulation of a player character and/or other player-controlled elements) and/or other items, to perform in-game actions within the virtual space. By way of non-limiting illustration, players 123 may include the first player and the second player that (can) interact with online gaming platform 105. The first player and the second player may control digital articles in or through a game hosted by online gaming platform 105. In some implementations, account inventories may be managed (at least in part) using blockchain 117a. For example, ownership rights (and/or other types of rights, as well as other usage information) of individual virtual items included in an individual account inventory may be recorded on blockchain 117a. In some implementations, at least some individual virtual items (also referred to as correlated entities) may correlate to individual unique digital articles (that may be tracked by registry servers 111). In some implementations, individual account inventories may correspond to individual smart contracts stored on blockchain 117a.

Interaction component 110 may be configured to enable, facilitate, and/or implement in-game actions by players 123 in instances of games. In some implementations, interaction component 110 may be configured to operate in response to instructions and/or (action) requests by players 123. Interaction component 110 may be configured to receive requests from players 123, e.g., in-game action instructions to perform in-game actions in the instance of the game. By way of non-limiting example, in-game actions may include one or more of performing a move, a dance, a movement, and/or another action within the game, accessing a level or area within the game, using a particular item, weapon, or another resource within the game, participating in a particular game mode (e.g., a Battle Royale mode), join a particular mission or team, engage in a particular type of exchange and/or challenge between players (or between unique digital articles), and/or other in-game actions. For example, one or more players may interact within online gaming platform 105 to build, create, gather, find, combine, and/or otherwise generate content (i.e., player-generated content). In some implementations, a player request may request access to a particular type or section of a store and/or marketplace within online gaming platform 105.

In some implementations, operations may be accomplished by interaction component 110 through user interfaces 125. In particular, operations pertaining to a particular player may be accomplished or controlled or initiated through a particular user interface 125 of a particular client computing platform 104, where the particular client computing platform 104 is associated with the particular player. In other words, the particular player may interact with an instance of a game through interaction component 110 and/or the particular user interface 125. In some implementations, operations by interaction component 110 may be limited, restricted, and/or otherwise controlled by other components of system 100. In some implementations, interaction component 110 may require acceptance from particular players (e.g., to perform certain operations). For example, an acceptance or confirmation may be required to accept a particular offer or invitation to partake in an activity or challenge. In some implementations, interaction component 110 may be configured to receive indications of acceptances and/or confirmations from players (related to offers and/or invitations).

In some implementations, interaction component 110 may be configured to facilitate interaction of players 123 with system 100. In some implementations, interaction component 110 may be configured to facilitate interaction by players 123 through user interfaces 125. For example, a particular player may be associated with a particular client computing platform 104, which may include a particular user interface 125. In other words, an individual player interface 125 may be player-specific and/or specific to a particular client computing platform 104. In some implementations, interaction component 110 may facilitate entry and/or selection through (presentation of) one or more user interfaces 125 (such as, by way of non-limiting example, any of the interfaces described in this disclosure).

Account component 112 is configured to manage player accounts. Player accounts may be associated with players 123. Player accounts may include and/or be associated with account inventories of virtual items. For example, the player accounts may include a first player account associated with a first player, a second player account associated with a second player, and so forth. For example, the first player account may include a first account inventory of one or more virtual items, the second player account may include a second account inventory of one or more virtual items and so forth. Individual players may control one or more virtual items in their individual account inventories. In some implementations, the first account inventory includes one or more unique digital articles (e.g., a first unique digital article, other unique digital articles, etc.). In some implementations, the second account inventory includes one or more unique digital articles (e.g., a second unique digital article, other unique digital articles, etc.). The first unique digital article may be correlated with a first in-game player-controllable character configured to be used (e.g., played with) in the instance of the game. The second unique digital article may be correlated with a second in-game player-controllable character configured to be used (e.g., played with) in the instance of the game, and so forth.

Presentation component 133 may be configured to present interfaces (e.g., user interfaces 125) to players, e.g., through client computing platforms 104 associated with the respective players. In some implementations, presentation component 133 may be configured to effectuate presentations of user interfaces 125 to players 123. Players may provide player input to user interfaces 125 to interact with the user interfaces 125. User interfaces 125 may enable players to define challenges and invite other players to partake in the challenges. For example, defining a challenge may include defining an objective, defining stakes for the participants, and/or defining or determining other information pertinent to the challenge. The objective of a challenge may be related to one or more events in the real world. By way of non-limiting example, an event may be a competition ("Competition X"), and the objective may be a particular team or competitor (e.g., "Competitor Y") winning the competition. The challenge may be evaluated based on real-world information, as determined based on the one or more events. By way of non-limiting example, after the competition has ended and the winning competitor is known, information about the competition and its results (i.e., real-world information) may be determined (e.g., "Competitor Y won Competition X"), and used to evaluate the (system-internal) challenge. The stakes may include one or more virtual items and/or objects that are of value and/or use within online gaming platform 105. In some implementations, a stake may be any benefit. Inviting other players to partake in challenges may include (initiation by a player of) transmitting and/or transferring information to client computing platforms 104 that are associated with the other players. This information may represent an invitation to partake in a challenge. The invitation and/or this information may correspond to the objective and the one or more stakes as defined through a particular user interface 125. A particular invitation may correspond to a particular challenge. Presentation component 133 may be configured to present a user interface to a particular player of the particular invitation. Put another way, presentation component 133 may present a presentation to the particular player, and the presentation may depict and/or otherwise include information that represents an invitation to partake in a particular challenge. The particular player may interact with this user interface to either accept or decline the invitation, e.g., by entering and/or selecting player input in this user interface. For example, presentation component 133 may receive an indication and/or confirmation of the particular player's acceptance of the invitation to partake in the particular challenge. In some implementations, presentations by presentation component 133 may be performed jointly (or at least in some cooperative manner) with one or both of game component 108 and/or interaction component 110. Presentation component 133 may present offers (e.g., for exchanges with other players, or for challenges) to particular players.

Figure 6:
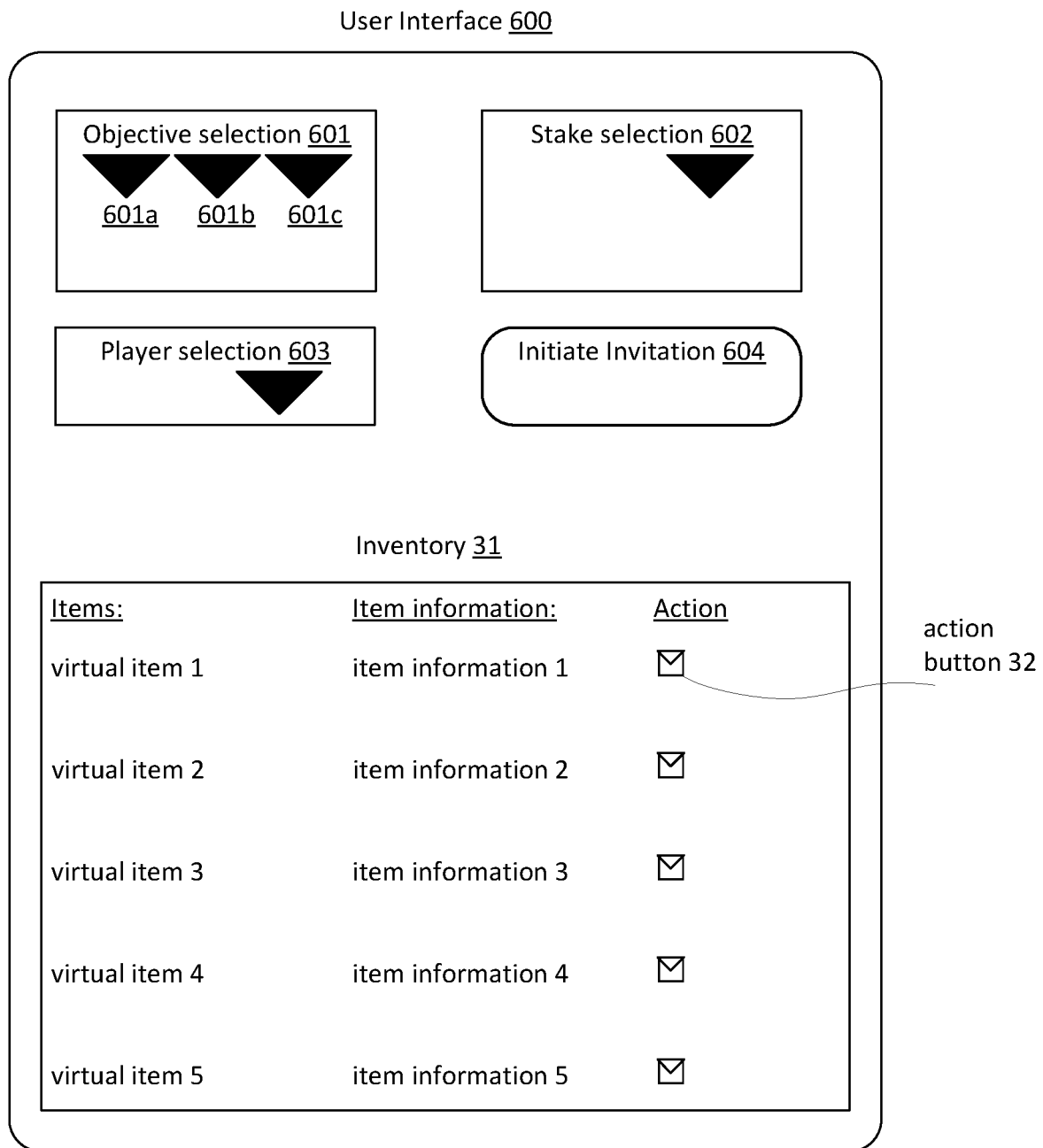
FIG. 6 illustrates an example implementation of a user interface to define elements of a challenge, as may be used by a system configured to effectuate challenges between unique digital articles, the challenges being evaluated based on particular real-world information, in accordance with one or more implementations.

FIG. 6 illustrates an example implementation of a user interface 600 as may be used by system 100, in accordance with one or more implementations. User interface 600 may enable users to define objectives and stakes for challenges and transmit invitations for the challenges to other players. User interface 600 may include a section or field for objective selection 601, a section or field for stake selection 602, a section or field for player selection 603, an action button to initiate invitation 604, a section or field for inventory 31, and/or other graphical user interface elements. Objective selection 601 may enable a user to enter and/or select an objective, through one or more graphical user interface elements, for a particular challenge (e.g., through one or more text fields or one or more dropdown menus, as indicated by the filled-in triangles 601a, 601b, and 601c inside objective selection 601). In some implementations, objective selection 601 may include different elements that together form the objective. One of the elements may be represented by triangle 601a, which could mean one of the following parts of an objective: select competitor "X". Another element may be represented by triangle 601b, which could mean one of the following parts of an objective: select competition "Y". Another element may be represented by triangle 601c, which could mean one of the following parts of an objective: select a predicted outcome or result "Z". These different elements may be combined to form an objective (e.g., a combination of the elements "X", "Y", and "Z" selected by triangle 601a, triangle 601b, and triangle 601c). In some implementations, individual elements (e.g., the elements selected by triangle 601a, triangle 601b, and triangle 601c) may individually correspond to one or more instructions that form the related smart contract. Stake selection 602 may enable a player to enter and/or select a stake, through one or more graphical user interface elements, for the particular challenge (e.g., through a text field or a dropdown menu). For example, the stake may be an item from inventory 31. For example, in some implementations, the player may be able to drag an item from inventory 31 into stake selection 602. Player selection 603 may enable a player to enter and/or select one or more other players as the proposed participating players in the particular challenge (e.g., through a text field or a dropdown menu). The action button "initiate invitation 604" may enable the player to initiate a transmission to the proposed participating players that represents an invitation to partake in the particular challenge (as defined through, at least, objective selection 601 and stake selection 602). As depicted, user inventory 31 may include a list of different virtual items and/or assets currently owned by a particular user, including virtual items 1-2-3-4-5. Inventory 31 further depicts item information regarding these virtual items, as indicated by item information 1-2-3-4-5, which correspond to virtual items 1-2-3-4-5, respectively. User inventory 31 as depicted may further include graphical user interface elements such as, by way of non-limiting example, an action button 32. Upon engagement by a user, action button 32 may select "virtual item 1" to be added to the stake for a particular challenge (e.g., via stake selection 602). In some implementations, the user may drag items from inventory 31 into the field of stake selection 602.

Referring to FIG. 1, recording component 114 is configured to record information, assets, and/or (unique) digital articles on permanent registries. In some implementations, the information may include executable code, such as, e.g., smart contracts. In some implementations, recording component 114 may record and/or modify usage information (including but not limited to ownership rights) pertaining to articles. In some implementations, recording component 114 may be configured to receive (recordation) requests to perform a recordation (e.g., of a unique digital article or a smart contract on a permanent registry). For example, recording component 114 may receive, from a first player, a recordation request to record and/or modify a first set of usage pertaining to a first unique digital article on a first permanent registry (such as, e.g., blockchain 117*a*). In some implementations, recording component 114 may receive such requests from online gaming platform 105 and/or other components of system 100. For example, a particular request to record (usage information and/or other rights pertaining to) a particular unique digital article may correspond to the issuance and/or creation of that particular unique digital article. When a unique digital article or other digital article is issued and/or created, recording component 114 may record its ownership on a particular permanent registry. In some implementations, a particular request to modify usage information pertaining to a particular unique digital article may correspond to an exchange of that particular unique digital article (e.g., between two players). By way of non-limiting example, a first set of usage information may control usage by a first player of a first unique digital article, a second set of usage information may control usage by a second player of a second unique digital article, and so forth. Recording component 114 may record the first and second sets of usage information on blockchain 117*a*. The first set of usage information may control a first sensitivity and/or a first eligibility of the first unique digital article to partake in challenges (i.e., the challenges as described in this disclosure), or partake in one or more particular types of challenges. The second set of usage information may control a second sensitivity and/or a second eligibility of the second unique digital article to partake in challenges, or partake in one or more particular types of challenges, and so forth.

In some implementations, recording component 114 may be configured to record executable code on a particular permanent registry, such as, e.g., blockchain 117*a*. In some implementations, particular executable code may be a particular smart contract. The particular smart contract may interact with one or more real-world information servers 119. In some implementations, the particular smart contract may be configured to receive real-world information from one or more real-world information servers 119. In some implementations, the particular smart contract may be executable to receive real-world information from one or more real-world information servers 119. In some implementations, the particular smart contract may be configured to perform one or more evaluations based on the received real-world information. In some implementations, the particular smart contract may be executable to perform one or more evaluations based on the received real-world information. In some implementations, the one or more evaluations may evaluate one or more challenges. For example, a first evaluation may evaluate whether a first unique digital article won a first challenge, a second evaluation may evaluate whether a second unique digital article won a second challenge, and so forth. In some implementations, recording component 114 may be configured to distribute and/or return one or more stakes based on the one or more evaluations. For example, assuming a first unique digital article won a particular challenge and a second unique digital article lost the particular challenge, recording component 114 may distribute the second stake (seized from the second player controlling the second unique digital article) to the first unique digital article or to the first player controlling the first unique digital article. Additionally, the first stake from the first player may be returned to the first unique digital article or to the first player controlling the first unique digital article. Likewise, assuming the first unique digital article lost the particular challenge and the second unique digital article won the particular challenge, recording component 114 may distribute the first stake (seized from the first player controlling the first unique digital article) to the second unique digital article or to the second player controlling the second unique digital article. Additionally, the second stake from the second player may be returned to the second unique digital article or to the second player controlling the second unique digital article.

In some implementations, one or more evaluations may further be based on eligibility information and/or sensitivity information (e.g., player-configurable sensitivity information). For example, sensitivity information may be specific to an individual unique digital article. For example, sensitivity information of an individual unique digital article may control whether the individual unique digital article can partake in challenges. For example, a first sensitivity may be specific to a first unique digital article, a second sensitivity may be specific to a second unique digital article, and so forth. In some implementations, sensitivity information for a particular unique digital article may be recorded on a permanent registry, e.g., as part of a set of usage information that controls usage by the owner of the particular unique digital article. In some implementations, sensitivity may be controllable and/or otherwise configurable by the owner (e.g., the owner of a particular unique digital article may turn sensitivity on or off per unique digital article, in other words activate or deactivate the sensitivity). Upon such deactivation, the particular unique digital article may no longer partake in (certain) challenges. Conversely, upon activation, the particular unique digital article may partake in (certain) challenges. Alternatively, and/or simultaneously, sensitivity may be controllable and/or otherwise configurable by or through online gaming platform 105 (e.g., an operator or other stakeholder of online gaming platform 105 may turn sensitivity on or off for one or more unique digital articles, in other words activate or deactivate the sensitivity).

Eligibility component 116 may be configured to determine and/or control eligibility, sensitivity, and/or availability of actions to players or to unique digital articles. In some implementations, actions may include in-game actions. In some implementations, actions may include participating in challenges. In some implementations, actions may include distributions of benefits, e.g., to unique digital articles. For example, the specific availability of a specific in-game action instruction (i.e., an in-game action instruction as requested) may require rights pertaining to a particular unique digital article. Eligibility component 116 may be configured to determine and/or control eligibility, sensitivity, and/or availability of players or unique digital articles to partake in challenges. For example, in some implementations, sensitivity to a specific (potential) distribution (or a series thereof) or a (potential) specific benefit (or a series thereof) may be configurable by the owner of a particular unique digital article (e.g., through configuring and/or modifying the set of usage information that controls usage of the particular unique digital article). Alternatively, and/or simultaneously, in some implementations, sensitivity to a specific (potential) distribution (or a series thereof) or a (potential) specific benefit (or a series thereof) may be configurable by or through online gaming platform 105 (e.g., an operator or administrative user or other stakeholder of online gaming platform 105 may turn sensitivity on or off for one or more unique digital articles).

In some implementations, sensitivity to a specific challenge (or a series thereof) may be configurable by the owner of a particular unique digital article (e.g., through configuring and/or modifying the set of usage information that controls usage of the particular unique digital article). In some implementations, sensitivity to a specific challenge (or a series thereof) may be configurable by or through online gaming platform 105 (e.g., an operator or administrative user or other stakeholder of online gaming platform 105 may turn sensitivity on or off for one or more unique digital articles). In some implementations, sensitivity to a specific challenge (or a series thereof) may be based on events in the real world (e.g., through real-world information from one or more real-world information servers 119). Determinations by eligibility component 116 may be used to control operations by other components of system 100, including but not limited to interaction component 110.

In some implementations, the particular sensitivity of a particular unique digital article may operate as a subscription to a series of challenges based on a specific type of real-world information or a specific category of events. For example, a particular player may subscribe a unique digital article to a series of challenges corresponding to a series of games (e.g., all regular season games, or all play-off games, or the championship game, etc. etc.) of his favorite team (say, Oakland Athletics). The particular player may have invited an opponent player to partake in this series of challenges. If the team wins (or rather, every time the team wins), the particular unique digital article wins a challenge (and the particular player wins a stake from the opponent player), as described elsewhere in this disclosure. If the team loses (or rather, every time the team loses), the particular player loses a challenge (and the particular player loses his stake to the opponent player). Players are able to turn subscriptions on and off. In some implementations, players may modify subscriptions (e.g., select a different team). In some implementations, the specifics of a subscription may be modifiable and/or otherwise configurable by administrative users, or changes in a subscription may occur as part of a game within online gaming platform 105.

In some implementations, eligibility component 116 may be configured to determine whether particular players are eligible to receive one or more participation rewards or attendance awards for either a particular unique digital article participating in an online event or attending an online event (e.g., during a particular time-limited duration, or between a begin time and an end time of the online event). Alternatively, and/or simultaneously, eligibility component 116 may be configured to determine whether particular players are eligible to receive one or more participation rewards or attendance awards for participating in a real-world event or attending a real-world event (e.g., during a particular time-limited duration). In some implementations, eligibility component 116 may be configured to determine whether particular players are eligible to receive distribution gains by virtue of owning distribution rights for one or more particular unique digital articles.

In some implementations, only a limited number of a particular type of subscriptions or series of challenges (say, to play-off games by Oakland Athletics in a specific season) may be available, so not every unique digital article that could potentially be eligible for this specific subscription can actually be eligible at the same time. For example, assume only a particular type of unique digital article could potentially be eligible for a particular type of subscription. Assume there are 1000 of these unique digital articles in the hands of players, but only 10 available subscriptions of this particular type at any given time. Assuming the potential benefit is valuable, the value of a first unique digital article with such a subscription may be significantly higher than the value of a second unique digital article without such a subscription, even if these unique digital articles are otherwise similar. In some implementations, a subscription may expire at some predetermined moment or after some predetermined duration. Assuming the potential benefit is valuable, the value of a first unique digital article with an unexpired subscription for the next 18 months may be significantly higher than the value of a second unique digital article with an unexpired subscription for the next 3 months, even if these unique digital articles and their subscriptions are otherwise similar except for expiration and/or duration. In some implementations, availability and/or status of a subscription for a particular unique digital article may be used to modify the depiction of a player-controllable character associated with the particular unique digital article in a view of interactive gameplay (e.g., the view may be depicting a topography of a simulated space included in an instance of a game). As such, the modification may indicate and/or otherwise represent to players in the instance of the game the current availability and/or status of this subscription (e.g., whether the subscription is activated or deactivated, as well as particulars regarding expiration and/or duration).

Performance component 118 may be configured to permit and/or perform requested in-game actions, e.g., to use particular unique digital articles. In some implementations, grants to use a particular unique digital article in accordance with a particular in-game action instruction may be granted based on one or more determinations by eligibility component 116. For example, grants may be granted for certain requested in-game actions, but not for others. For example, particular requested in-game actions may be performed if requested by a first player, but not a second player. In some implementations, performance component 118 may permit and/or perform some types of requests, but not other types of requests. In some implementations, grants and/or performance may be prevented for certain types of requests, unless the pertinent (required) combination of unique digital articles is currently recorded on a particular permanent registry as being owned by a particular player or account.

In some implementations, grants and/or performance by performance component 118 may require not only a particular type of request, but additionally may require the pertinent unique digital article (or other digital article that is not fungible) currently be recorded on a particular permanent registry (or a particular type of permanent registry). For example, a requirement for grants or performance may include recordation on a private permissioned permanent registry. In some implementations, actions by performance component 118 may be performed responsive to particular actions or results from other components of system 100, including but not limited to eligibility component 116 and/or registry-analysis component 120.

Registry-analysis component 120 may be configured to determine whether one or more unique digital articles are recorded (on a particular permanent registry) as being owned by a particular player and/or account. For example, registry-analysis component 120 may determine whether a first unique digital article is currently recorded on a private permissioned permanent registry. In some implementations, registry-analysis component 120 may be configured to analyze recordations and other transactions on one or more permanent registries, e.g., by retrieving recorded information from the one or more permanent registries and analyzing whether any of the recorded transactions pertain to a particular unique digital article, or a set of unique digital articles. In some implementations, determinations by registry-analysis component 120 may be performed responsive to particular actions or results from other components of system 100, including but not limited to eligibility component 116. In some implementations, registry-analysis component 120 may be configured to determine whether rights pertaining to a particular unique digital article has ever been recorded on a public permanent registry. For example, actions by other components of system 100, including but not limited to distribution component 124, may be responsive to determinations by registry-analysis component 120. In some implementations, determinations by registry-analysis component 120 may occur in real-time or near-real-time as needed for a particular in-game action instruction or request. In some implementations, determinations by registry-analysis component 120 may occur as needed when rights pertaining to (unique) digital articles is modified, and results of such determinations are stored for later use by, e.g., online gaming platform 105, e.g., to be used when responding to a future in-game action instruction and/or a future request.

Notification component 122 may be configured to notify players. For example, notification component 122 may notify players 123 in response to events, distributions, in-game action instructions, challenges, modifications of sensitivities, and/or other activities in system 100. In some implementations, a player may be notified responsive to a requested in-game action (as requested through an in-game action instruction) not being permitted or not being performed (e.g., as determined by performance component 118). In some implementations, actions by notification component 122 may be performed responsive to particular actions, results, determinations, evaluations, challenges, and/or decisions from other components of system 100, including but not limited to eligibility component 116, performance component 118, and/or registry-analysis component 120. For example, notification component 122 may respond to a particular in-game action instruction (by a particular player, and pertaining to a particular unique digital article) with a particular response such that, responsive to a particular determination, the particular response notifies the particular player accordingly.

Distribution component 124 may be configured to distribute and/or otherwise provide one or more of information, benefits, stakes, access to in-game content, access to game-specific communication channels, certificates, rewards, awards, prizes, distribution gains, and/or virtual items to players 123. In some implementations, distribution component 124 may be configured to seize and/or distribute stakes related to challenges.

Distributions by distribution component 124 may be adjusted, e.g., by adjustment component 126. In some implementations, distributions may be based on operations by eligibility component 116. In some implementations, distributions may be responsive to determinations by reward component 131. In some implementations, distributions may be based on and/or responsive to actions by other components of system 100, including but not limited to registry server 111, a particular permanent registry, and/or registry-analysis component 120. For example, online gaming platform 105 may determine a particular player is eligible to receive one or more rewards or awards. Distribution component 124 may distribute the one or more rewards or awards in accordance with the determined eligibility. For example, a reward may be a participation reward. For example, an award may be an attendance award. For example, a certificate may be a certificate of completion or accomplishment, which may be specific to actions within the instance of the game. For example, a prize may be for effort, time, and/or resources spent, specifically in the instance of the game. For example, particular unique digital articles may be associated with distribution rights, and the particular player who owns those distribution rights may receive distribution gains in accordance with those distribution rights. For example, distribution gains may result from a particular action or activity (such as, e.g., a particular challenge related to a particular digital article), e.g., within the online gaming platform 105, involving the particular digital article.

Adjustment component 126 may be configured to adjust and/or modify distributions, including (planned or expected) distributions by distribution component 124. In some implementations, adjustment component 126 may be configured to adjust and/or modify stakes. In some implementations, adjustment component 126 may adjust and/or modify one or more benefits, stakes, certificates, rewards, awards, prizes, distribution gains, stakes, and/or virtual items that have been determined, e.g., by reward component 131 (also referred to as the determined distribution, the eligible distribution, or the evaluated challenge). Upon such adjustment and/or modification, this determined distribution (or eligible distribution, or evaluated challenge) may be referred to as the adjusted distribution or adjusted evaluation. Distribution component 124 may distribute the adjusted distribution. In some implementations, distribution component 124 may effectuate the adjusted evaluation. In some implementations, adjustments and/or modifications by adjustment component 126 may increase the value of one or more elements of the eligible distribution or the evaluated challenge (this may provide a positive incentive to players). Alternatively, and/or simultaneously, adjustments and/or modifications by adjustment component 126 may decrease the value of one or more elements of the eligible distribution or the evaluated challenge (this may provide a negative incentive to players, or, e.g., a positive incentive when decreasing the stake that is lost). In some implementations, actions by adjustment component 126 may be performed responsive to particular actions or results from other components of system 100, including but not limited to eligibility component 116 and/or registry-analysis component 120.

Registry component 128 may be configured to generate sets of instructions for registry servers 111 (e.g., registry server 111*a*) and/or one or more permanent registries (e.g., blockchain 117*a*). In some implementations, registry component 128 may be configured to transfer the generated sets of instructions to registry servers 111 and/or one or more permanent registries. In some implementations, one or more of these instructions may instruct the formation of a smart contract and/or the recording of the smart contract on the one or more permanent registries (e.g., blockchain 117*a*). In some implementations, one or more of these instructions may call and/or otherwise invoke a method or function of a smart contract on the one or more permanent registries (e.g., blockchain 117*a*). In some implementations, these instructions may instruct registry servers 111 to record and/or modify unique digital articles, transactions, and/or rights on one or more permanent registries, or to analyze ownership as recorded on the one or more permanent registries. In some implementations, these instructions may instruct registry servers 111 to record and/or modify sets of usage information (e.g., ownership rights) pertaining to unique digital articles. For example, registry component 128 may transfer a particular set of instructions that, upon execution by blockchain 117a, issue a new unique digital article to a particular player or particular account (i.e., record the rights and/or other usage information pertaining to the new unique digital article, including it being owned by the particular player or the particular account). Individual unique digital articles may be associated with individual sets of usage information, including but not limited to ownership rights. For example, registry component 128 may transfer a particular set of instructions that, upon execution by blockchain 117a and blockchain 117b, remove a particular unique digital article from blockchain 117a and add the particular unique digital article to blockchain 117b. For example, registry component 128 may transfer a particular set of instructions that, upon execution by blockchain 117a and blockchain 117b, analyze whether a particular player owns one or more particular unique digital articles.

Reward component 131 may be configured to determine eligibility for unique digital articles, other digital articles, accounts, and/or players 123 to receive one or more of information, benefits, stakes, access to in-game content, access to game-specific communication channels, certificates, rewards, awards, prizes, distribution gains, and/or virtual items. In some implementations, these types of determinations may be based on and/or responsive to actions by other components of system 100, including but not limited to registry-analysis component 120. In some implementations, online gaming platform 105 may determine a particular player is eligible to receive one or more rewards or awards. Distributions in accordance with the determined eligibility may be made by distribution component 124. In some implementations, (one or more elements of) such eligible distributions may be adjusted and/or modified by adjustment component 126 prior to being distributed.

Receipt component 136 may be configured to receive (sets of) instructions to add, modify, analyze, and/or remove recorded information (e.g., rights) in blockchain 117a. For example, receipt component 136 may receive one or more sets of instructions from registry component 128, online gaming platform 105, and/or other components of system 100. Receipt component 136 may provide received sets of instructions to record component 134 for execution. In some implementations, execution of individual ones of the instructions received may include invoking one or more function calls of an Application Programming Interface (API) 107. For example, API 107 may be configured to provide interactive communication between blockchain 117a and other components of system 100. For example, in some implementations, API 107 may support methods or functions that are implemented as function calls to smart contracts stored on blockchain 117a. For example, in some implementations, API 107 may support methods or functions that analyze whether a particular player owns one or more particular unique digital articles, one or more particular types of unique digital articles, and/or a particular collection of multiple unique digital articles. For example, in some implementations, API 107 may support methods or functions that analyze the status of a particular (type of) sensitivity for one or more particular unique digital articles. In some implementations, receipt component 136 may be arranged, organized, and/or otherwise included in registry server 111 and/or blockchain 117a.

Transaction component 134 may be configured to record information, including but not limited to (ownership) rights pertaining to digital articles, e.g., on one or more permanent registries, such as blockchain 117a. In some implementations, transaction component 134 may record information on electronic storage 130b. In some implementations, transaction component 134 may record information on blockchain 117a. The information may include ownership rights, distribution rights, other rights, and/or other information. For example, particular recorded information may reflect rights pertaining to a particular digital article by a particular player or group of players. For example, a particular unique digital article may represent a three-dimensional in-game player-controllable item or character that can interact with other virtual items within online gaming platform 105. Recorded information may be specific to a digital article (i.e., article-specific). For example, distribution rights for a particular digital article may designate rights to certain distributions of benefits upon a specifically defined in-game action (e.g., an exchange between players) involving the particular digital article.

In some implementations, transaction component 134 may be configured to record information in blockchain 117a. In some implementations, transaction component 134 may add, modify, analyze, and/or remove recorded information. For example, in accordance with received instructions from receipt component 136, transaction component 134 may transfer rights pertaining to a particular digital article from a first owner to a second owner (e.g., from an original owner to a new owner, or from a loser of a challenge to a winner of the challenge) such that the recorded information on blockchain 117a no longer reflect the rights pertaining to the particular digital article by the first player. In some implementations, in accordance with received instructions, transaction component 134 may transfer rights pertaining to a particular digital article temporarily, e.g., from a first owner to a temporary second owner such as a smart contract. In some case, a temporary owner may be a holding account that is merely used until ownership is transferred to either the original owner or a new owner. As used herein, the term "temporary" (and derivatives thereof) refers to a transfer or to ownership that is either known to be changed and/or modified within a predetermined period, or expected to be changed and/or modified within a predetermined period. Conversely, a non-temporary transfer from a first owner to a second owner (due to a particular exchange) can conceivably be changed and/or reverted (back from the second owner to the first owner) due to a separate and new exchange that is independent of the first particular exchange. In some implementations, in accordance with received instructions, transaction component 134 may transfer rights pertaining to a particular digital article non-temporarily from a first owner to a second owner, e.g., when a particular exchange is not reversible or no longer reversible. In some implementations, transaction component 134 may be arranged, organized, and/or otherwise included in blockchain 117a.

In some implementations, transaction component 134 may be configured to obtain article-specific information (e.g., ownership rights, distribution rights, sensitivity information, and/or other information) for particular digital articles. In some implementations, transaction component 134 may be configured to access blockchain 117a to obtain the article-specific information (that are recorded on blockchain 117a, e.g., in one or more smart contracts).

Input component 135 may be configured to receive user input from administrative users. For example, the user input may include entry and/or selection of particular information, unique digital articles, types of digital articles, virtual items, types of virtual items, and/or any entity or object that interacts with any part of system 100 and/or plays a part in the operation of system 100. For example, an administrative user may select a particular set of unique digital articles (e.g., all "Camo Blankos" that have been issued) as the input set of unique digital articles for other components of system 100, such as eligibility component 116. Additionally, in some implementations, the administrative user may select a particular adjustment to be enacted by adjustment component 126 (e.g., increase the value of one or more elements of a benefit or distribution) for one or more types of determinations by reward component 131 (e.g., an eligible distribution of a reward of 100 virtual coins for leveling up a unique digital article in the selected set of unique digital articles). As another example, the administrative user may select a different set of unique digital articles (e.g., all "Boss Dino Blankos" that have been issued) as the input set of unique digital articles for other components of system 100. Additionally, the administrative user may select a particular adjustment to be enacted by adjustment component 126 (e.g., decrease the value of one or more elements of the eligible distribution, or decreases the stake for a particular challenge) for one or more types of determinations by reward component 131 (e.g., an eligible distribution may be receiving the distribution gains based on particular in-game actions for unique digital articles in the selected set of unique digital articles).

Communication component 137 may be configured to facilitate communication and/or interaction between administration server 115 and the rest of system 100. For example, communication component 137 may communicate user input received from administrative users by input component 135 to other components of system 100, particularly online gaming platform 105.

Transformation component 139 may be configured to determine information. In some implementations, transformation component 139 may determine real-world information based on events that have occurred in the real world (e.g., based on event information regarding the events that are occurring and/or have occurred in the real world). In some implementations, real-world information (and/or the events they are based on) may be deterministic. In some implementations, real-world information (and/or the events they are based on) may be quantifiable. In some implementations, real-world information (and/or the events they are based on) may be measurable. In some implementations, transformation component 139 may be configured to receive the event information regarding the events that are occurring and/or have occurred in the real world, and the determined information may be based on this received event-information. Transformation component 139 may transform information about the real world into real-world information for use by other components of system 100. In some implementations, transformation component 139 may be part of real-world information server 119.

Transfer component 141 may be configured to transfer information to other components of system 100, including but not limited to registry server 111 and/or a permanent registry. The transferred information may be determined by another component of system 100, including but not limited to transformation component 139. In some implementations, transfer component 141 may be part of real-world information server 119.

Figure 3A:
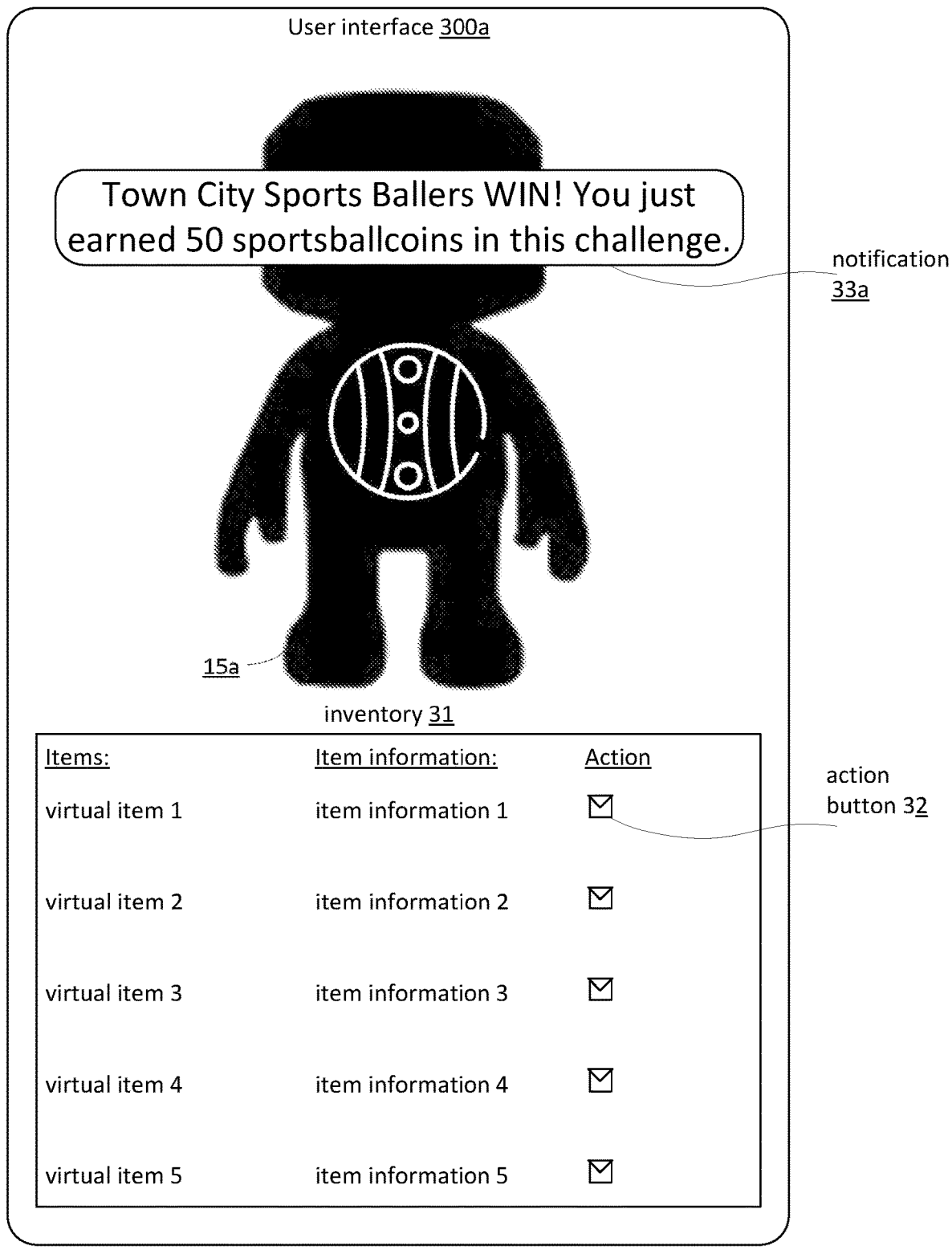
FIGS. 3A-3B-3C illustrate example implementations of player interfaces, as may be used by a system configured to effectuate challenges between unique digital articles, the challenges being evaluated based on particular real-world information, in accordance with one or more implementations.

FIG. 3A illustrates an example implementation of a user interface 300a as may be used by system 100, in accordance with one or more implementations. User interface 300a may enable a particular player (say, "Alice", not depicted) to view and/or use an account inventory and/or one or more unique digital articles controlled by the particular player. User interface 300a may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32 (which initiates an in-game action instruction). Upon engagement by Alice, in-game action instruction button 32 may request "virtual item 1" to be used for a particular request (e.g., through a text field or a dropdown menu, as indicated by a triangle in a box). For example, Alice may request to activate (or turn on the sensitivity of) unique digital article 15a for a particular challenge or type of challenge, and unique digital article 15a may be associated with a player-controllable in-game character that is also depicted in user interface 300a. User interface 300a as depicted may further include graphical user interface elements such as, by way of non-limiting example, a notification element 33a. Alice may participate, through unique digital article 15a, in a challenge (against unique digital article 15b, not depicted) that is based on the result of a particular game by "Town City Sports Bailers", a dynasty in sportsball, and easily recognized by the round logo on the body of unique digital article 15a. Upon a win in this particular game, a stake may be won by Alice, as indicated by notification 33a, labeled "Town City Sports Bailers WIN! You just earned 50 sportsballcoins in this challange." Note that if Alice deactivated the sensitivity of unique digital article 15a, unique digital article 15a would not be able to participate in future challenges.

Figure 3B:
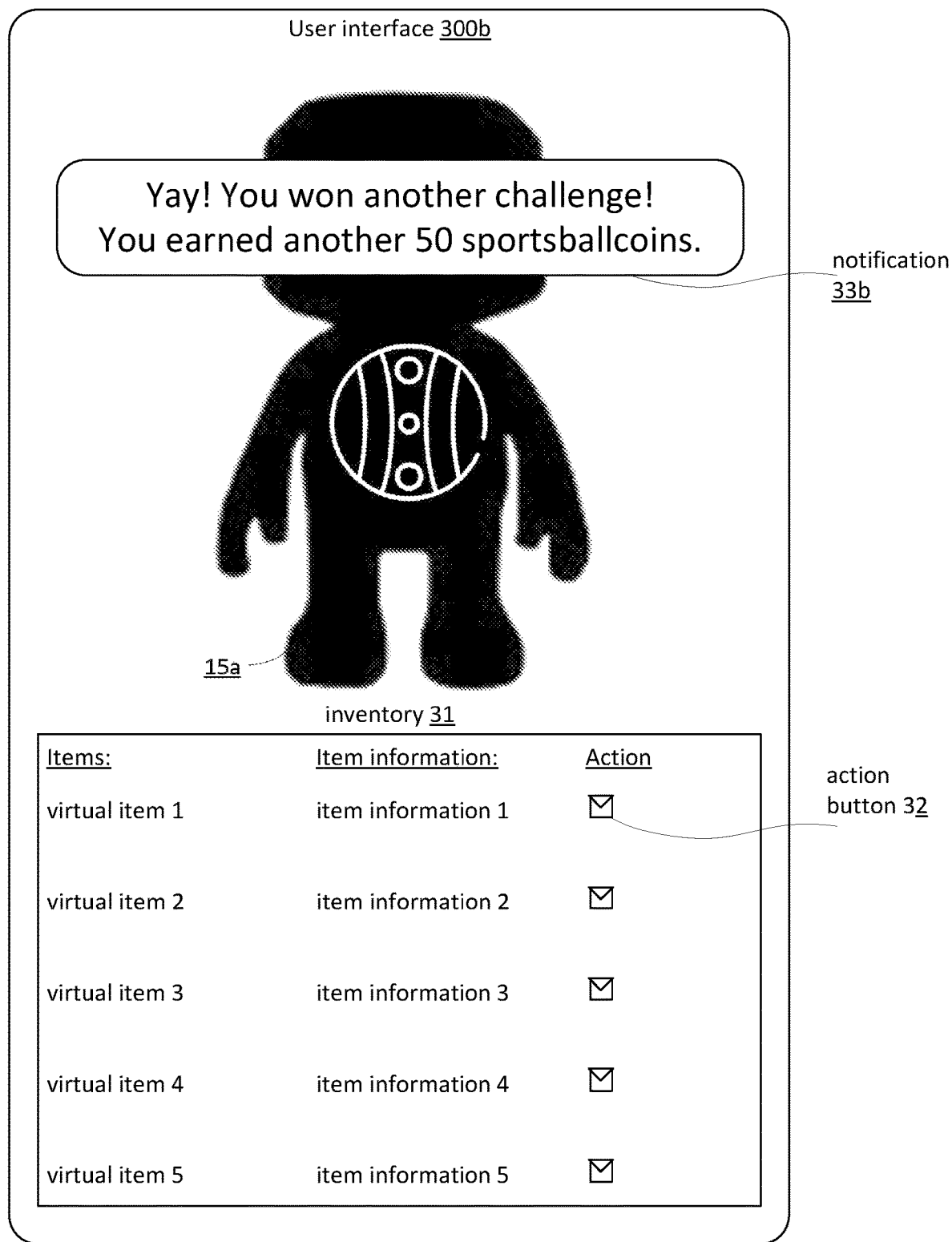

FIG. 3B illustrates an example implementation of a user interface 300b as may be used by system 100, in accordance with one or more implementations. User interface 300b may enable a particular player (say, "Alice", not depicted) to view and/or use an account inventory and/or one or more unique digital articles controlled by the particular player. User interface 300b may include a section or field for account inventory 31, and/or other graphical player interface elements. As depicted, account inventory 31 may include a list of different virtual items and/or articles currently controlled by Alice, including virtual items 1-2-3-4-5. Account inventory 31 further depicts item information regarding these virtual items, as indicated by item information 1-2-3-4-5, which correspond to virtual items 1-2-3-4-5, respectively. Account inventory 31 as depicted may further include graphical user interface elements such as, by way of non-limiting example, an action button 32 (which initiates an in-game action instruction). Upon engagement by Alice, in-game action instruction button 32 may request "virtual item 1" to be used for a particular request (e.g., through a text field or a dropdown menu, as indicated by a triangle in a box). For example, Alice may request to display in-game information about unique digital article 15a, and unique digital article 15a may be associated with a player-controllable in-game character that is also depicted in user interface 300b. User interface 300b as depicted may further include graphical user interface elements such as, by way of non-limiting example, a notification element 33b. Alice may have subscribed and/or otherwise activated sensitivity of unique digital article 15a for a series of challenges against another unique digital article, based on the results of a series of games by "Town City Sports Bailers", as described in regard to FIG. 3A. Upon a win by this team, a stake may be provided to Alice, as indicated by notification 33b, labeled "Yay! You won another challenge! You earned another 50 sportsballcoins." Note that if Alice deactivated sensitivity for unique digital article 15a, no stakes would be received or lost, regardless of the results of the games.

Figure 3C:
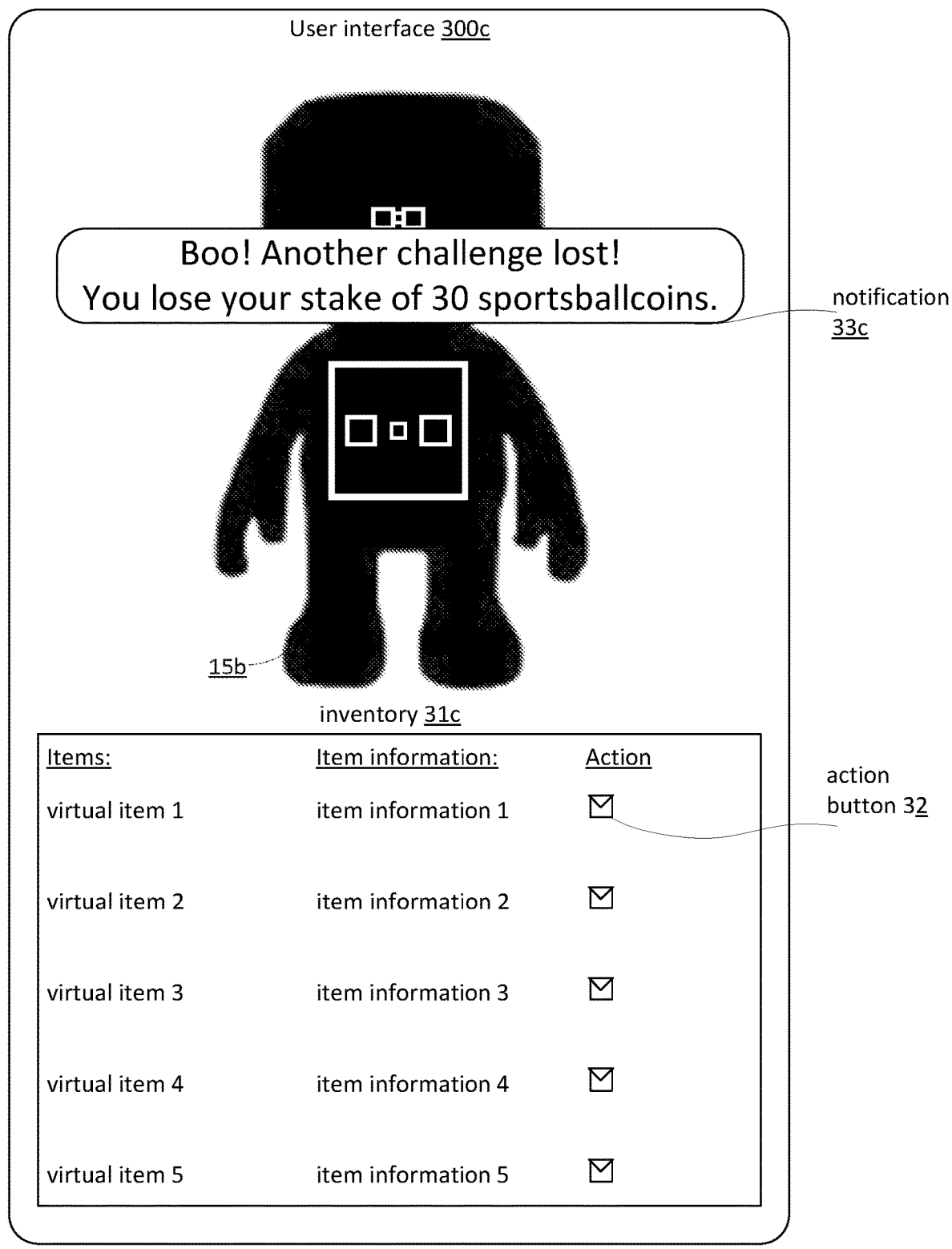

FIG. 3C illustrates an example implementation of a user interface 300c as may be used by system 100, in accordance with one or more implementations. User interface 300c may enable a particular player (say, "Bob", not depicted) to view and/or use an account inventory and/or one or more unique digital articles controlled by the particular player. User interface 300c may include a section or field for account inventory 31c, and/or other graphical user interface elements. As depicted, account inventory 31c may include a list of different virtual items and/or articles currently controlled by Bob, including virtual items 1-2-3-4-5. Account inventory 31c further depicts item information regarding these virtual items, as indicated by item information 1-2-3-4-5, which correspond to virtual items 1-2-3-4-5, respectively. Account inventory 31c as depicted may further include graphical user interface elements such as, by way of non-limiting example, an action button 32 (which initiates an in-game action instruction). Upon engagement by Bob, in-game action instruction button 32 may request "virtual item 1" to be used for a particular request (e.g., through a text field or a dropdown menu, as indicated by a triangle in a box). For example, Bob may request to display in-game information about unique digital article 15b, and unique digital article 15b may be associated with a player-controllable in-game character that is also depicted in user interface 300c. User interface 300c as depicted may further include graphical user interface elements such as, by way of non-limiting example, a notification element 33c. Bob may have accepted an invitation to partake in a particular series of challenges with unique digital article 15b, based on the results of a series of games by "Citytown Ballsporters" (the perennial rival of "Town City Sports Ballers") who are easily recognized by the square logo on the body of unique digital article 15b. Upon a loss by this team, Bob loses his stake, as indicated by notification 33c, labeled "Boo! Another challenge lost! You lose your stake of 30 sportsballcoins." Note that if Bob deactivated sensitivity for unique digital article 15b, he would lose no stakes regardless of how many games were lost.

Figure 5A:
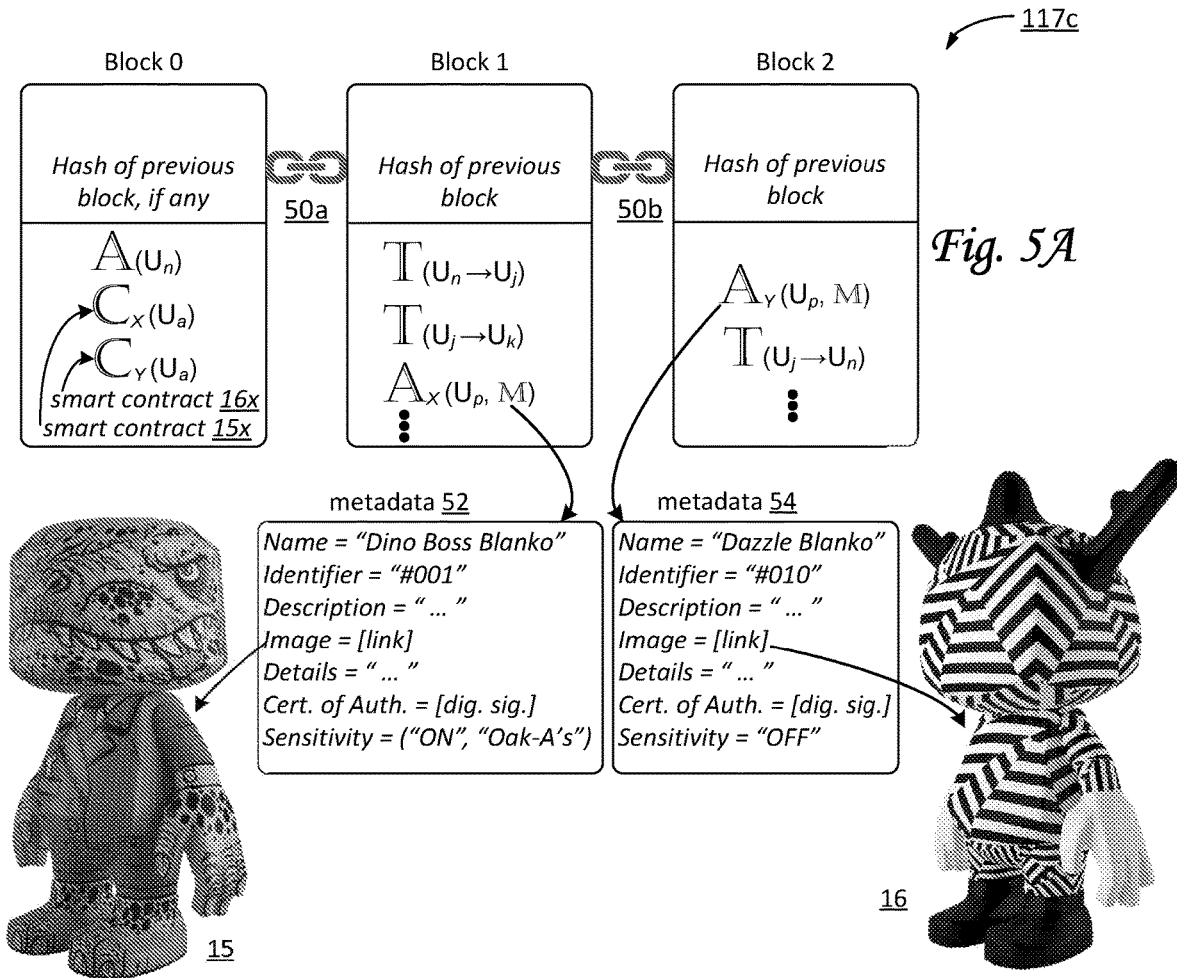
FIGS. 5A-5B illustrate exemplary permanent registries, as may be used by a system configured to effectuate challenges between unique digital articles, the challenges being evaluated based on particular real-world information, in accordance with one or more implementations.

FIG. 5A illustrate exemplary blockchain 117c as may be used by system 100, in accordance with one or more implementations. FIG. 5A illustrates a blockchain 117c that includes a block 0, a block 1, and a block 2. As time progresses, more blocks may be added to blockchain 117c. The blocks within blockchain 117c are ordered. In block 0, one article (indicated by a capital "A") is generated and/or assigned to player "n" ($U_n$). A second digital article, a smart contract 15x is assigned to player "a" ($U_a$), and a third digital article, a smart contract 16x, is assigned to player "a" ($U_a$), which may be an administrative user. For example, smart contract 15x and smart contract 16x may be or include templates for issuing particular types of unique digital articles. Smart contract 15x and smart contract 16x may have been posted to blockchain 117c by a component similar to record component 134.

For example, the articles in block 0 may include individual ownership rights recorded for particular digital articles within an online gaming platform, similar to or the same as online game platform 105. Block 1 is connected to block 0 (as indicated by a link 50a), for example by including an address of block 1 in block 0, or vice versa. Likewise, block 1 is connected to block 2, as indicated by a link 50b. In block 1, a transaction to smart contract 15x (indicated by "Ax") is recorded. Transaction Ax to smart contract 15x may issue a unique digital article to player "p", the unique digital article being defined by metadata 52. Here, metadata 52 is correlated to a player-controllable character named "Dino Boss Blanko", having identifier "#001", as depicted by a linked image of unique digital article 15, as well as including various other fields of information, including a digital signature that serves as a certificate of authenticity, and sensitivity information for particular challenges or types of challenges. Here, the sensitivity is turned ON, and subscribed/sensitive to a series of challenges that are evaluated based on the results for a series of games by Oakland Athletics. In block 1, another transactions from player "n" to player "j", and from player "j" to player "k" are also recorded. In block 2, several transactions may be recorded: a transaction from player "j" to player "n", and a transaction to smart contract 16x (indicated by "Ay") is recorded. Transaction Ay to smart contract 16x may issue a unique digital article to player "p", the unique digital article being defined by metadata 54 (here, correlated to a player-controllable character named "Dazzle Blanko", having identifier "#010", as depicted by a linked image of unique digital article 16, as well as including various other fields of information, with sensitivity turned OFF). In block 2, another transaction is recorded, from player "j" to player "n".

Figure 5B:
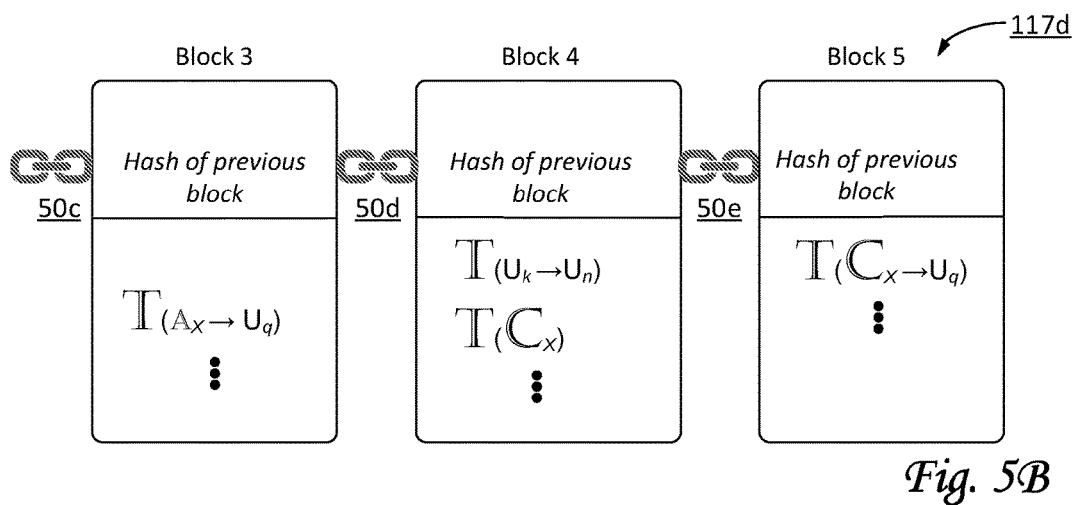

By way of non-limiting example, FIG. 5B illustrates a blockchain 117d that includes several blocks (block 3, block 4, block 5), that have been appended to blockchain 117c. Block 3 may be connected to block 2 (as indicated by link 50c), block 4 may be connected to block 3 (as indicated by a link 50d), and block 5 may be connected to block 4 (as indicated by a link 50e). In block 3, another transaction may be recorded that modifies the rights pertaining to the unique digital article (indicated by "Ax" and defined by metadata 52) to player "q", such that player "p" no longer owns this "Dino Boss Blanko". Block 4 includes a transaction (indicated by a capital "T") from player "k" to player "n". For example, the transaction may represent a purchase of a first virtual item by player "n" from seller player "k". Additionally, block 4 includes a transaction to smart contract 15x. For example, this transaction may represent real-world information (or the results of one or more evaluations based on real-world events, such as in this example a win by the Oakland Athletics) being transferred to smart contract 15x. Block 5 includes a transaction from smart contract 15x to player "q", which may represent the distribution of a stake to user "q" due to the current challenge involving this "Dino Boss Blanko", based on the real-world information of the win by the Oakland Athletics. If this game had been lost, player "q" would have lost the stake as defined in the corresponding sensitivity information. Player "p" still owns a "Dazzle Blanko", but its sensitivity is turned OFF, so there is no related distribution or loss/seizure of stake.

Figure 4:
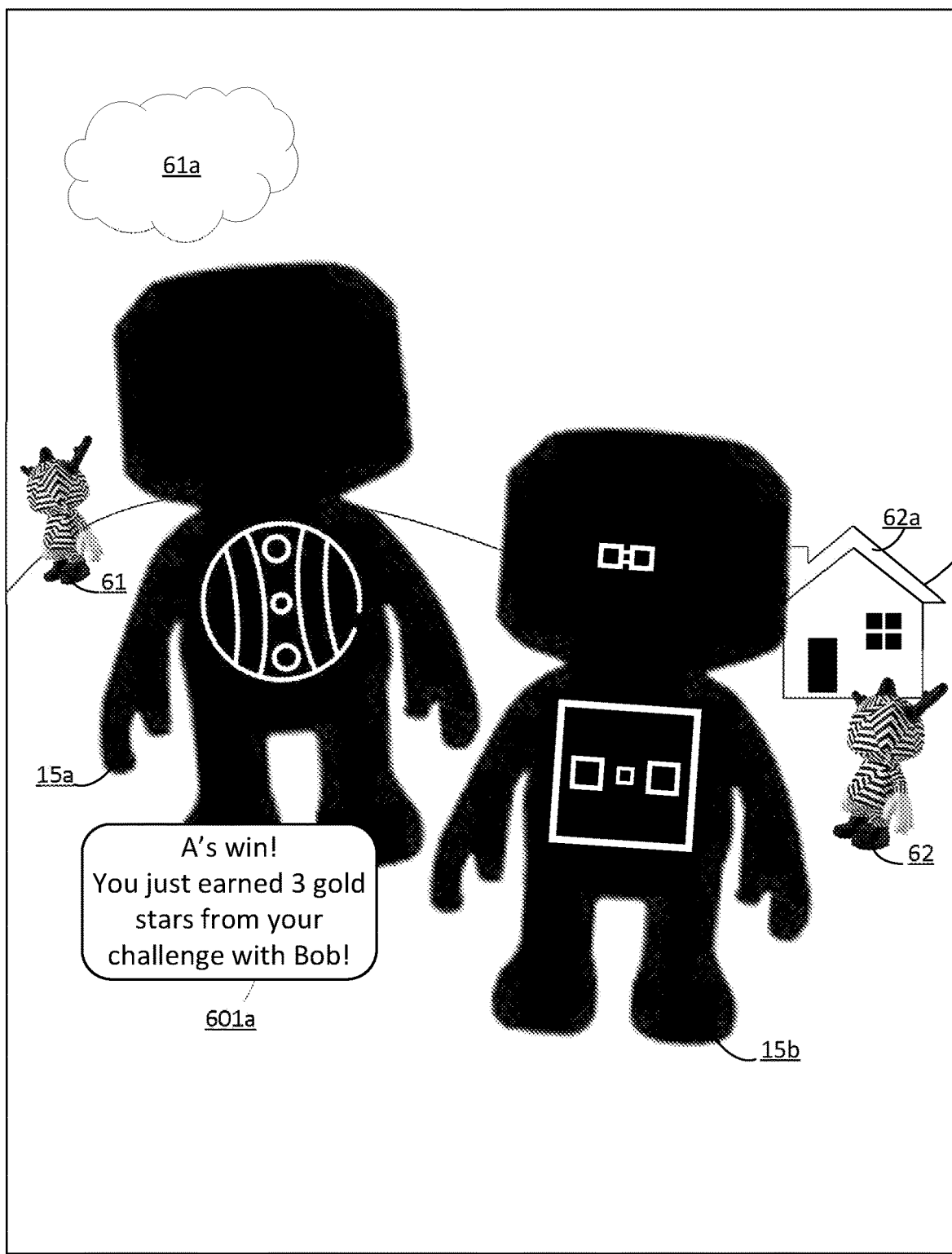
FIG. 4 illustrates an exemplary view of interactive gameplay in an instance of a game, as may be used by a system configured to effectuate challenges between unique digital articles, the challenges being evaluated based on particular real-world information, in accordance with one or more implementations.

By way of non-limiting example, FIG. 4 depicts a view 400 of interactive gameplay by a particular player (say, "Alice", not depicted), using unique digital article 15a (depicted as a particular in-game player-controllable character). Other players may be active and present in view 400 (depicting a topography of a simulated space included in the instance of a game), for example a first player-controllable character 61 (standing below a cloud 61a), a second player-controllable character 62 (standing near an in-game structure 62a that looks like a house), and unique digital article 15b. Assume that both unique digital article 15a and unique digital article 15*b* are currently participating in the same challenge (both using a stake of 3 gold stars), based on real-world results of Oakland Athletics games. As the results of a pertinent game are received, transformed, and/or transferred by one or more real-world information servers 119 (not depicted), and subsequently evaluated by one or more smart contracts, a component of system 100 may either distribute or seize stakes as appropriate, and notify Alice as indicated by a notification 601*a*, labeled "A"s win! You just earned 3 gold stars from your challenge with Bob!".

Referring to FIG. 1, user interfaces 125 may be configured to facilitate interaction between players 123 and system 100 and/or between players 123 and client computing platforms 104. For example, user interfaces 125 may provide an interface through which players 123 may provide information to and/or receive information from system 100. In some implementations, user interface 125 may include one or more of a display screen, touchscreen, monitor, a keyboard, buttons, switches, knobs, levers, mouse, microphones, sensors to capture voice commands, sensors to capture body movement, sensors to capture hand and/or finger gestures, and/or other player interface devices configured to receive and/or convey player input. In some implementations, one or more user interfaces 125 may be included in one or more client computing platforms 104. In some implementations, one or more user interfaces 125 may be included in system 100. In some implementations, user interface 125 may be a type of interface that facilitates the exchange of virtual items between players.

Referring to FIG. 1, in some implementations, online gaming platforms 105, server(s) 102, client computing platform(s) 104, administration servers 115, registry servers 111, real-world information servers 119, and/or external resources 138 may be operatively linked via one or more electronic communication links. For example, such electronic communication links may be established, at least in part, via one or more networks 13 such as the Internet and/or other networks. It will be appreciated that this is not intended to be limiting, and that the scope of this disclosure includes implementations in which online gaming platforms 105, server(s) 102, client computing platform(s) 104, administration servers 115, registry servers 111, and/or external resources 138 may be operatively linked via some other communication media.

A given client computing platform 104 may include one or more processors configured to execute computer program components. The computer program components may be configured to enable an expert or player associated with the given client computing platform 104 to interface with system 100 and/or external resources 138, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

Administration server(s) 115 may include one or more of servers 102*a*, processors 132*a*, machine-readable instructions 106*a*, electronic storage 130*a*, and/or other components. Server(s) 102*a* may be configured by machine-readable instructions 106*a*. Machine-readable instructions 106*a* may include one or more instruction components. The instruction components may include one or more of input component 135, communication component 137, and/or other instruction components. Administration server 115 may include communication lines, or ports to enable the exchange of information with a network and/or other computing platforms. In some implementations, administration servers 115 may be used by one or more administrative users, e.g., to configure and/or control operation of system 100. In some implementations, administrative servers 115 may include or player one or more player interfaces to receive player input and/or otherwise interact with one or more administrative users.

External resources 138 may include sources of information outside of system 100, external entities participating with system 100, external providers of computation and/or storage services, and/or other resources. In some implementations, some or all of the functionality attributed herein to external resources 138 may be provided by resources included in system 100. In some implementations, one or more external resources 138 may provide information (e.g., event information regarding events that are occurring and/or have occurred in the real world) to transformation component 139, real-world information server 119, and/or other components of system 100. In some implementations, external resources 138 may include one or more real-world information servers or blockchain oracles.

Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 108, 110, 112, 114, 116, 118, 120, 122, 124, 126, 128, 131, 133, 134, 135, 136, 137, 139, and/or 141, and/or other components. Processor(s) 132 may be configured to execute components 108, 110, 112, 114, 116, 118, 120, 122, 124, 126, 128, 131, 133, 134, 135, 136, 137, 139, and/or 141, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 116, 118, 120, 122, 124, 126, 128, 131, 133, 134, 135, 136, 137, 139, and/or 141 are illustrated in FIG. 1 as being implemented within a single processing unit, in implementations in which processor(s) 132 includes multiple processing units, one or more of components 108, 110, 112, 114, 116, 118, 120, 122, 124, 126, 128, 131, 133, 134, 135, 136, 137, 139, and/or 141 may be implemented remotely from the other components. The description of the functionality provided by the different components 108, 110, 112, 114, 116, 118, 120, 122, 124, 126, 128, 131, 133, 134, 135, 136, 137, 139, and/or 141 described below is for illustrative purposes only, and is not intended to be limiting, as any of components 108, 110, 112, 114, 116, 118, 120, 122, 124, 126, 128, 131, 133, 134, 135, 136, 137, 139, and/or 141 may provide more or less functionality than is described. For example, one or more of components 108, 110, 112, 114, 116, 118, 120, 122, 124, 126, 128, 131, 133, 134, 135, 136, 137, 139, and/or 141 may be eliminated, and some or all of its functionality may be provided by other ones of components 108, 110, 112, 114, 116, 118, 120, 122, 124, 126, 128, 131, 133, 134, 135, 136, 137, 139, and/or 141. As another example, processor(s) 132 may be configured to execute one or more additional components that may perform some or all of the functionality attributed below to one of components 108, 110, 112, 114, 116, 118, 120, 122, 124, 126, 128, 131, 133, 134, 135, 136, 137, 139, and/or 141.

Figure 2:
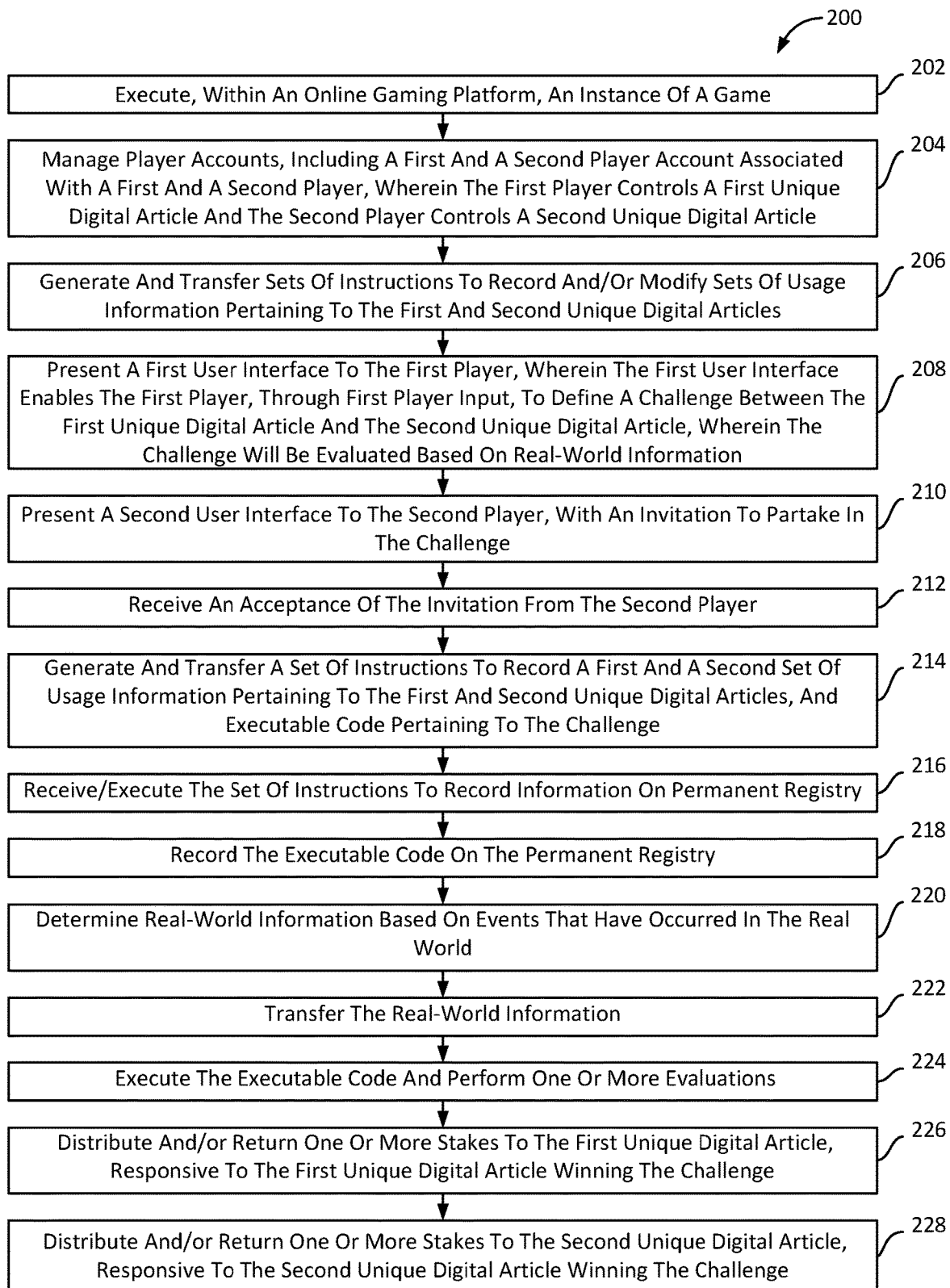
FIG. 2 illustrates a method of effectuating challenges between unique digital articles, the challenges being evaluated based on particular real-world information, in accordance with one or more implementations.

FIG. 2 illustrates a method 200 of effectuating challenges between unique digital articles, the challenges being evaluated based on particular real-world information, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a game is executed, within the online gaming platform, to facilitate presentation of the game to players, and in-game actions are implemented in the instance of the game in response to in-game action instructions for the in-game actions by the players. Presentation of the game is based on views of the game that are determined during execution of the instance of the game. The players include a first player and a second player. In some embodiments, operation 202 is performed by a game component the same as or similar to game component 108 (shown in FIG. 1 and described herein).

At an operation 204, player accounts associated with the players are managed. The player accounts include a first player account associated with the first player and a second player account associated with the second player. The first player account includes a first account inventory of a first set of virtual items. The second player account includes a second account inventory of a second set of virtual items. The first player controls the first set of virtual items in the first account inventory. The second player controls the second set of virtual items in the second account inventory. The first account inventory includes a first unique digital article that is associated with a first in-game player-controllable character usable in the instance of the game. The second account inventory includes a second unique digital article that is associated with a second in-game player-controllable character usable in the instance of the game. In some embodiments, operation 204 is performed by an account component the same as or similar to account component 112 (shown in FIG. 1 and described herein).

At an operation 206, sets of instructions are generated and transferred to record and/or modify a first set of usage information pertaining to the first unique digital article and a second set of usage information pertaining to the second unique digital article. In some embodiments, operation 206 is performed by a recording component and/or a registry component the same as or similar to recording component 114 and/or registry component 128 (shown in FIG. 1 and described herein).

At an operation 208, a first presentation is effectuated of a first user interface to the first player. The first user interface enables the first player, through first player input, to define an objective for a challenge between the first unique digital article and the second unique digital article. The challenge will be evaluated based on real-world information. The first user interface enables the first player to define one or more stakes for the challenge. The one or more stakes includes one or more virtual items and/or objects that are usable within the online gaming platform. The first user interface enables the first player initiate transmission of information representing an invitation for the second player to partake in the challenge through the second unique digital article. The information is transmitted to a client computing platform associated with the second user. The invitation corresponds to the objective and the one or more stakes as defined through the first user interface. In some embodiments, operation 208 is performed by a presentation component the same as or similar to presentation component 133 (shown in FIG. 1 and described herein).

At an operation 210, a second presentation is effectuated of the invitation to the second player. In some embodiments, operation 210 is performed by a presentation component the same as or similar to presentation component 133 (shown in FIG. 1 and described herein).

At an operation 212, an indication of acceptance of the invitation is received to partake in the challenge, from the client computing platform associated with the second player, by the second player. In some embodiments, operation 212 is performed by a presentation component the same as or similar to presentation component 133 (shown in FIG. 1 and described herein).

At an operation 214, a set of instructions is generated and transferred to record and/or modify information. The set of instructions records a first set of usage information pertaining to the first unique digital article. The set of instructions records a second set of usage information pertaining to the second unique digital article. The set of instructions records executable code pertaining to the challenge. In some embodiments, operation 214 is performed by a recording component and/or a registry component the same as or similar to recording component 114 and/or registry component 128 (shown in FIG. 1 and described herein).

At an operation 216, a first set of instructions is received and executed to record, on the permanent registry, the first set of usage information. The first set of usage information controls usage by the first player of the first unique digital article. A second set of instructions is received and executed to record, on the permanent registry, the second set of usage information. The second set of usage information controls usage by the second player of the second unique digital article. The first set of usage information controls a first sensitivity of the first unique digital article to partake in challenges, including the challenge. The second set of usage information controls a second sensitivity of the second unique digital article to partake in challenges, including the challenge. In some embodiments, operation 216 is performed by a receipt component and/or a transaction component, the same as or similar to receipt component 136 and/or transaction component 134 (shown in FIG. 1 and described herein).

At an operation 218, the executable code is recorded on the permanent registry. The executable code is configured to (i) receive the real-world information from a real-world information server, and (ii) perform one or more evaluations based on the received real-world information. The one or more evaluations evaluate the challenge. In some embodiments, operation 218 is performed by a receipt component and/or a transaction component, the same as or similar to receipt component 136 and/or transaction component 134 (shown in FIG. 1 and described herein).

At an operation 220, the real-world information is determined based on events that have occurred in the real world, external to the real-world information server and the system. In some embodiments, operation 220 is performed by a transformation component the same as or similar to transformation component 139 (shown in FIG. 1 and described herein).

At an operation 222, the real-world information is transferred to at least one of the registry server and the permanent registry. In some embodiments, operation 222 is performed by a transfer component the same as or similar to transfer component 141 (shown in FIG. 1 and described herein).

At an operation 224, execution of the executable code and performance of the one or more evaluations are effectuated. The one or more evaluations evaluate the challenge. In some embodiments, operation 224 is performed by a transaction component the same as or similar to transaction component 134 (shown in FIG. 1 and described herein).

At an operation 226, the one or more stakes are distributed and/or returned to either the first unique digital article or the first player, responsive to the performance of the one or more evaluations evaluating that the first unique digital article won the challenge. In some embodiments, operation 226 is performed by a distribution component the same as or similar to distribution component 124 (shown in FIG. 1 and described herein).

At an operation 228, the one or more stakes are distributed and/or returned to either the second unique digital article or the second player, responsive to the performance of the one or more evaluations evaluating that the second unique digital article won the challenge. In some embodiments, operation 228 is performed by a distribution component the same as or similar to distribution component 124 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. It is to be understood that the present technology contemplates that, to the extent possible, one or more features of any implementation can be combined with features of any other implementation.

What is claimed is:

1. A system configured to effectuate challenges between unique digital articles, the challenges being evaluated based on particular real-world information, the system comprising:

an online gaming platform including one or more hardware processors configured by machine-readable instructions to:

execute, within the online gaming platform, an instance of a game to facilitate presentation of the game to players, and implement in-game actions in the instance of the game in response to in-game action instructions by the players, wherein the presentation of the game is based on views determined during execution of the instance of the game, wherein the players include a first player and a second player;

manage player accounts associated with the players, wherein the player accounts include a first player account associated with the first player and a second player account associated with the second player, wherein the first player account includes a first account inventory including a first unique digital article that is associated with a first in-game player-controllable character, wherein the second player account includes a second account inventory including a second unique digital article that is associated with a second in-game player-controllable character;

effectuate a first presentation of a first user interface to the first player that enables the first player, through first player input, to (i) define an objective for a challenge between the first unique digital article and the second unique digital article, wherein the challenge will be evaluated based on real-world information, and (ii) define one or more stakes for the challenge, including one or more virtual items and/or objects that are usable within the online gaming platform;

effectuate a second presentation to the second player of an invitation to partake in the challenge, wherein the invitation corresponds to the objective and the one or more stakes as defined through the first user interface; and responsive to acceptance by the second player of the invitation, generate and transfer, to a registry server that implements a permanent registry, a set of instructions to record and/or modify executable code pertaining to the challenge; and the registry server including one or more processors configured by one or more machine-readable instructions to:
receive and record, on the permanent registry, the executable code, wherein the executable code is configured to (i) obtain the real-world information from a real-world information server, wherein the real-world information is based on events that have occurred in the real world, external to the real-world information server, and (ii) perform one or more evaluations based on the real-world information, wherein the one or more evaluations evaluate the challenge; and
effectuate execution of the executable code;

wherein either the one or more processors included in the registry server or the one or more hardware processors included in the online gaming platform are further configured to:
responsive to the one or more evaluations evaluating that the first unique digital article won the challenge, distribute and/or return the one or more stakes to either the first unique digital article or the first player; and
responsive to the one or more evaluations evaluating that the second unique digital article won the challenge, distribute and/or return the one or more stakes to either the second unique digital article or the second player.

2. The system of claim 1, wherein winning the challenge is mutually exclusive between the first unique digital article and the second unique digital article.

3. The system of claim 1, wherein the events in the real world include competitions in professional sports, wherein the challenge is evaluated based on a first competition selected from the competitions in professional sports.

4. The system of claim 1, wherein the one or more stakes for the challenge include a first stake provided by the first player and a second stake provided by the second player.

5. The system of claim 4, wherein either the one or more processors included in the registry server or the one or more hardware processors included in the online gaming platform are configured to:
responsive to the performance of the one or more evaluations evaluating that the first unique digital article won the challenge, distribute the second stake to the first unique digital article and return the first stake to the first player; and
responsive to the performance of the one or more evaluations evaluating that the second unique digital article won the challenge, distribute the first stake to the second unique digital article and return the second stake to the second player.

6. The system of claim 1, wherein the one or more hardware processors included in the online gaming platform are further configured to:
present a user interface to the first player that enables the first player, through first player input, to:
(i) modify a first sensitivity of the first unique digital article to partake in the challenges,
(ii) modify a particular category of events in the real world on which the real-world information is based,
(iii) enter and/or select a first stake that will potentially be lost based on the one or more evaluations, and
(iv) initiate transmission of article-specific information to the registry server for recordation on the permanent registry, wherein the article-specific information corresponds to the first player input.

7. The system of claim 1, wherein effectuating the second presentation of the invitation to the second player is performed through a second user interface presented in the client computing platform associated with the second player, and wherein receiving an indication of the acceptance is performed through the second user interface.

8. The system of claim 1, wherein, by virtue of ownership, the first in-game player-controllable character is configured to be controlled by the first player in the instance of the game and the second in-game player-controllable character is configured to be controlled by the second player in the instance of the game.

9. The system of claim 6, wherein the first sensitivity specifies a series of potential distributions corresponding to a series of the events in the real world, wherein the first and second unique digital articles are subscribed to the real-world information pertaining to the series of events in the real world, and wherein transferring the real-world information to at least one of the registry server and the permanent registry includes publishing the real-world information to one or more subscribed unique digital articles, including the first and second unique digital articles.

10. The system of claim 1, further comprising:
the real-world information server including one or more particular processors configured by particular machine-readable instructions to:
determine the real-world information based on the events that have occurred in the real world, external to the real-world information server and the system; and
transfer the real-world information to at least one of the registry server and the permanent registry.

11. A method of effectuating challenges between unique digital articles, the challenges being evaluated based on particular real-world information, the method comprising:
executing, within an online gaming platform, an instance of a game to facilitate presentation of the game to players, and implementing in-game actions in the instance of the game in response to in-game action instructions by the players, wherein the presentation of the game is based on views determined during execution of the instance of the game, wherein the players include a first player and a second player;
managing player accounts associated with the players, wherein the player accounts include a first player account associated with the first player and a second player account associated with the second player, wherein the first player account includes a first account inventory including a first unique digital article that is associated with a first in-game player-controllable character, wherein the second player account includes a second account inventory including a second unique digital article that is associated with a second in-game player-controllable character;
effectuating a first presentation of a first user interface to the first player that enables the first player, through first player input, to (i) define an objective for a challenge between the first unique digital article and the second unique digital article, wherein the challenge will be evaluated based on real-world information, and (ii) define one or more stakes for the challenge, including one or more virtual items and/or objects that are usable within the online gaming platform;
effectuating a second presentation to the second player of an invitation to partake in the challenge, wherein the invitation corresponds to the objective and the one or more stakes as defined through the first user interface;

responsive to acceptance by the second player of the invitation, generating and transferring a set of instructions to record and/or modify executable code pertaining to the challenge;

receiving and recording, on a permanent registry, the executable code, wherein the executable code is configured to (i) obtain the real-world information from a real-world information server, wherein the real-world information is based on events that have occurred in the real world, external to the real-world information server, and (ii) perform one or more evaluations based on the real-world information, wherein the one or more evaluations evaluate the challenge;

effectuating execution of the executable code;

distributing and/or returning the one or more stakes to either the first unique digital article or the first player, responsive to the one or more evaluations evaluating that the first unique digital article won the challenge; and distributing and/or returning the one or more stakes to either the second unique digital article or the second player, responsive to the one or more evaluations evaluating that the second unique digital article won the challenge.

12. The method of claim 11, wherein winning the challenge is mutually exclusive between the first unique digital article and the second unique digital article.

13. The method of claim 11, wherein the events in the real world include competitions in professional sports, wherein the challenge is evaluated based on a first competition selected from the competitions in professional sports.

14. The method of claim 11, wherein the one or more stakes for the challenge include a first stake provided by the first player and a second stake provided by the second player.

15. The method of claim 14, wherein:

responsive to the performance of the one or more evaluations evaluating that the first unique digital article won the challenge, distributing the second stake to the first unique digital article and returning the first stake to the first player; and responsive to the performance of the one or more evaluations evaluating that the second unique digital article won the challenge, distributing the first stake to the second unique digital article and returning the second stake to the second player.

16. The method of claim 11, further comprising:

presenting a user interface to the first player that enables the first player, through first player input, to:
  (i) modify a first sensitivity of the first unique digital article to partake in the challenges,
  (ii) modify a particular category of events in the real world on which the real-world information is based,
  (iii) enter and/or select the first stake that will potentially be lost based on the one or more evaluations, and
  (iv) initiate transmission of article-specific information to the registry server for recordation on the permanent registry, wherein the article-specific information corresponds to the first player input.

17. The method of claim 11, wherein effectuating the second presentation of the invitation to the second player is performed through a second user interface presented in the client computing platform associated with the second player, and wherein receiving an indication of the acceptance is performed through the second user interface.

18. The method of claim 11, wherein, by virtue of ownership, the first in-game player-controllable character is controlled by the first player in the instance of the game and the second in-game player-controllable character is controlled by the second player in the instance of the game.

19. The method of claim 16, wherein the first sensitivity specifies a series of potential distributions corresponding to a series of the events in the real world, wherein the first and second unique digital articles are subscribed to the real-world information pertaining to the series of events in the real world, and wherein transferring the real-world information to at least one of the registry server and the permanent registry includes publishing the real-world information to one or more subscribed unique digital articles, including the first and second unique digital articles.

20. The method of claim 11, further comprising:

determining the real-world information based on the events that have occurred in the real world, external to the real-world information server and the system; and transferring the real-world information to at least one of the registry server and the permanent registry.

* * * * *